(12) United States Patent
Lee et al.

(10) Patent No.: US 7,353,942 B2
(45) Date of Patent: Apr. 8, 2008

(54) DISK HOUSING CASE WITH INDEX AND CONTACT OPENING THEREFOR

(75) Inventors: Sunhee Lee, Tokyo (JP); Kazuaki Taga, Tokyo (JP); Yosuke Sumiya, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 280 days.

(21) Appl. No.: 11/184,998

(22) Filed: Jul. 20, 2005

(65) Prior Publication Data

US 2006/0016702 A1 Jan. 26, 2006

(30) Foreign Application Priority Data

| Jul. 21, 2004 | (JP) | ............................ 2004-212924 |
| Feb. 2, 2005 | (JP) | ............................ 2005-026917 |
| Feb. 2, 2005 | (JP) | ............................ 2005-026918 |
| Feb. 2, 2005 | (JP) | ............................ 2005-026919 |
| Feb. 2, 2005 | (JP) | ............................ 2005-026920 |
| Feb. 2, 2005 | (JP) | ............................ 2005-026921 |
| Feb. 2, 2005 | (JP) | ............................ 2005-026922 |
| Jul. 12, 2005 | (JP) | ............................ 2005-202472 |

(51) Int. Cl.
*B65D 85/57* (2006.01)
*B65D 71/00* (2006.01)

(52) U.S. Cl. .................. 206/308.1; 206/232; 206/804; 206/815

(58) Field of Classification Search ............ 206/308.1, 206/308.2, 232, 459.5, 804, 815
See application file for complete search history.

(56) References Cited

U.S. PATENT DOCUMENTS

| 5,341,924 A | * | 8/1994 | Morrone ..................... 206/232 |
| 5,388,713 A | * | 2/1995 | Taniyama .................. 220/4.22 |
| 5,495,940 A | * | 3/1996 | Taniyama ................ 206/308.1 |
| 5,542,531 A | * | 8/1996 | Yeung ..................... 206/308.1 |
| 5,878,879 A | * | 3/1999 | Liao ........................ 206/308.1 |
| 5,931,296 A | * | 8/1999 | Kobayashi et al. ...... 206/308.3 |
| 5,960,948 A | * | 10/1999 | Shiga et al. ................. 206/232 |
| 7,104,397 B2 | * | 9/2006 | Ulrich ..................... 206/308.1 |

FOREIGN PATENT DOCUMENTS

| JP | 10-106203 A | 4/1998 |
| JP | 3094214 U | 3/2003 |

* cited by examiner

*Primary Examiner*—Bryon P Gehman
(74) *Attorney, Agent, or Firm*—Sughrue Mion, PLLC

(57) ABSTRACT

Insertion and removal of an index, which is interposed between a disk tray and a case half in which the disk tray is fitted, is facilitated in a disk housing case. The disk housing case is constituted by a disk tray and a first and a second case half for housing the disk tray. The index is interposed between the disk tray and the second case half. An index opening is provided at an end at which the case halves are linked, or at an end opposite the linked end. Contact openings, for enabling a finger or an index sliding member to contact the index to insert and remove the index, are provided in at least one of the disk tray and the second case half.

17 Claims, 24 Drawing Sheets

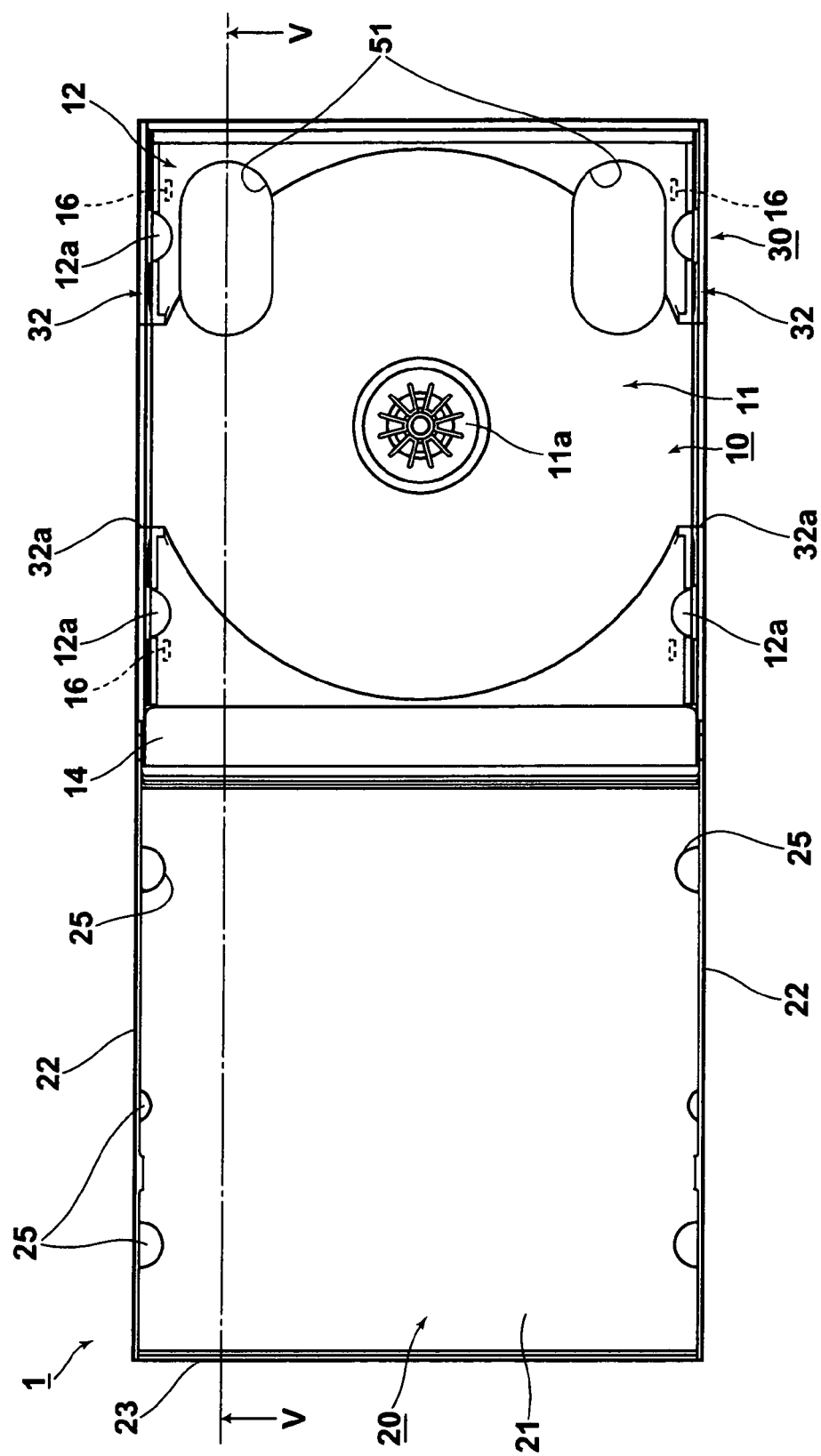

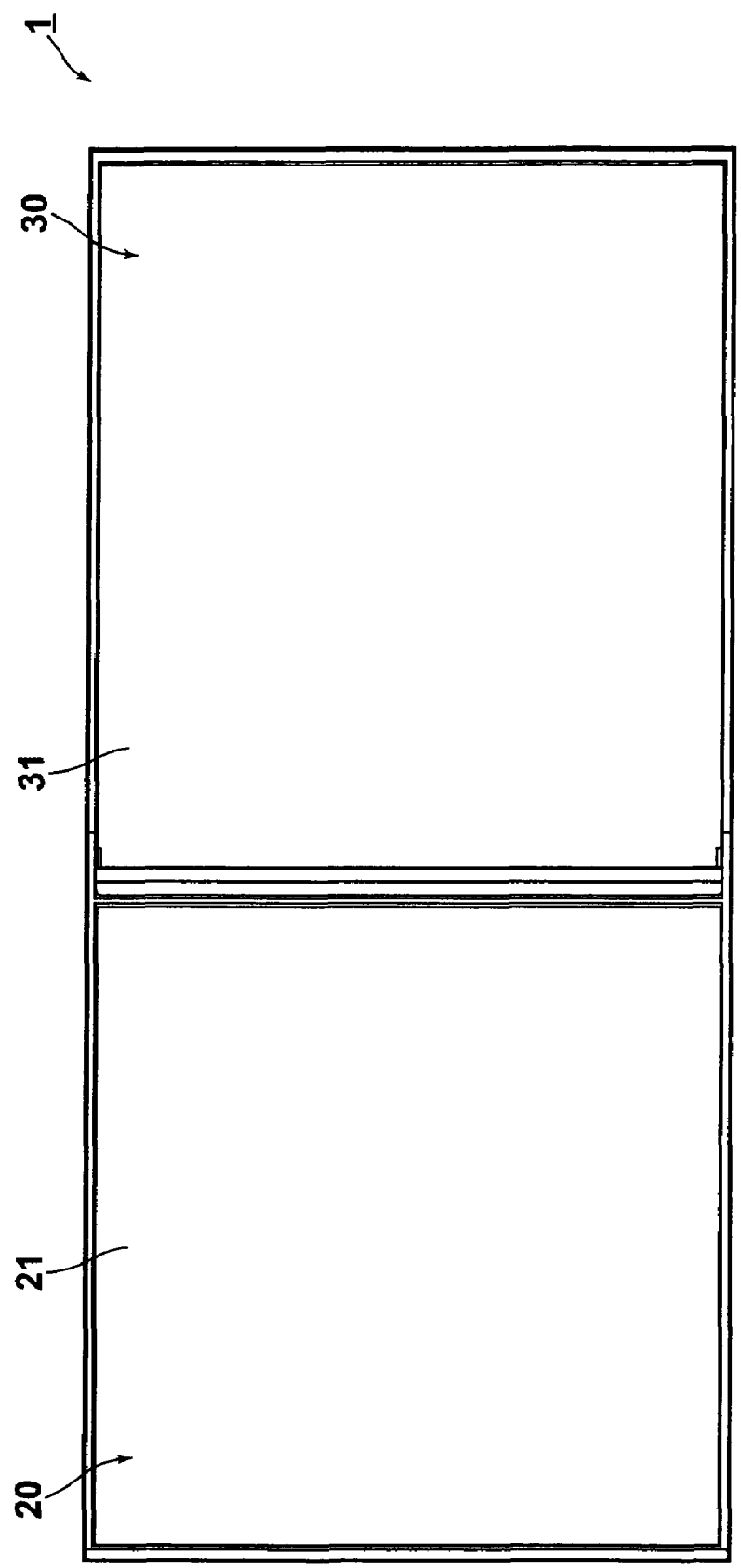

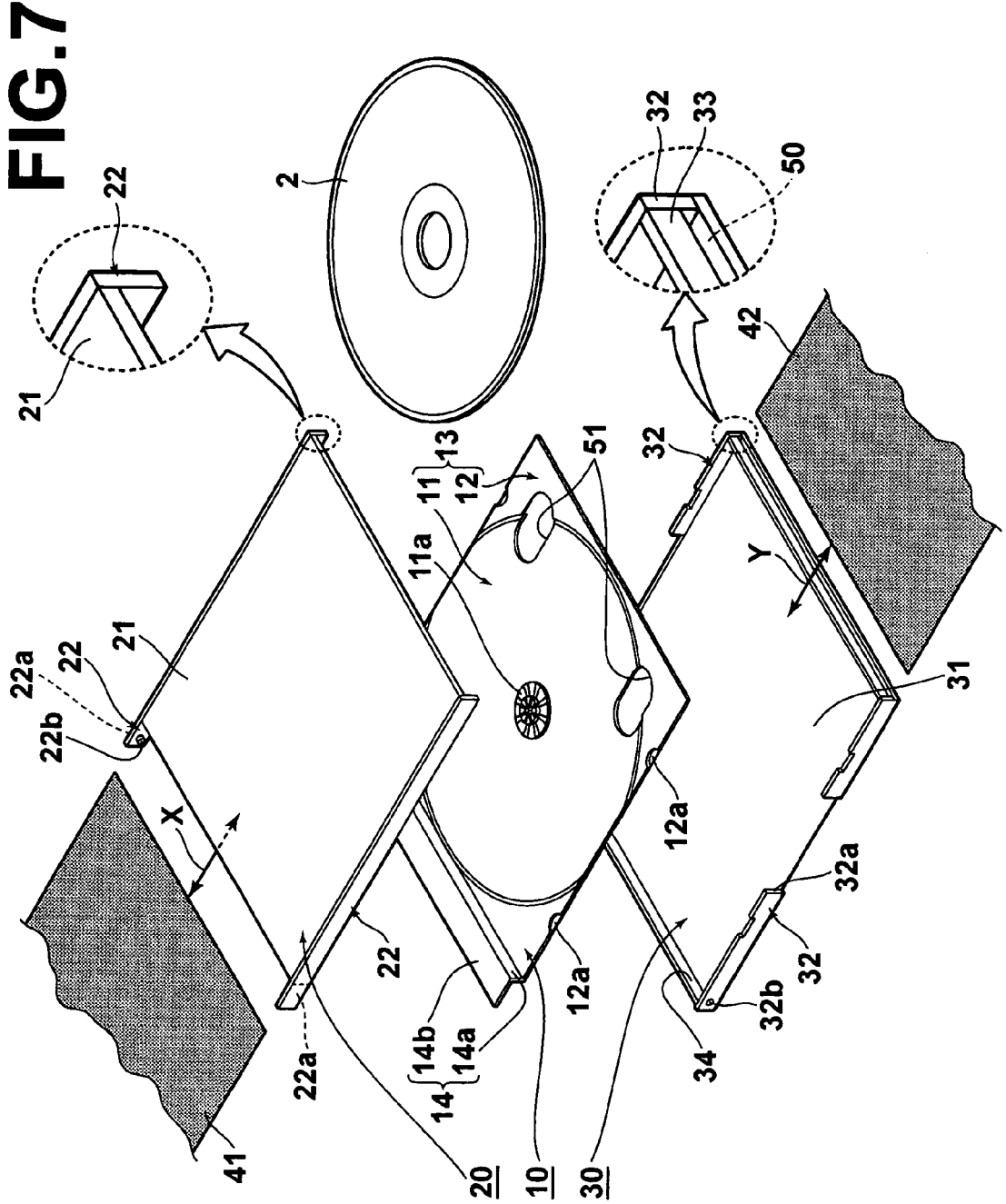

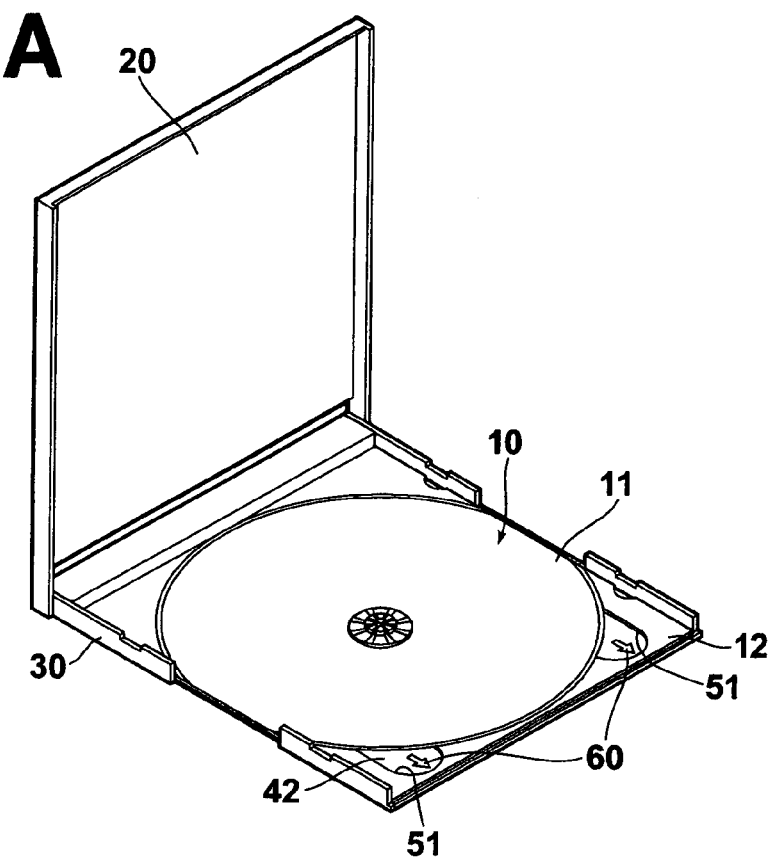
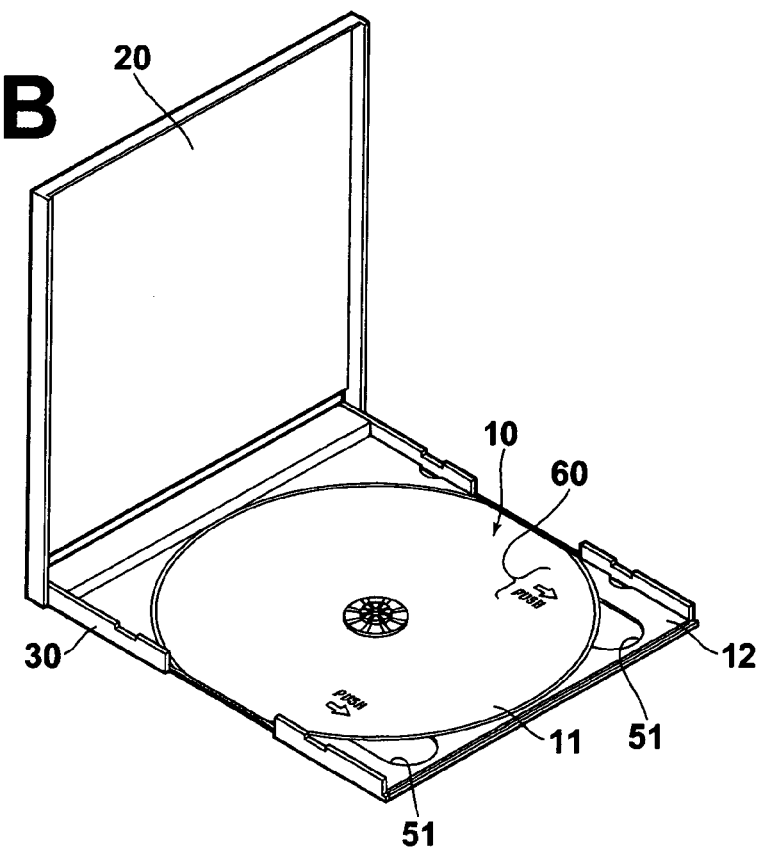

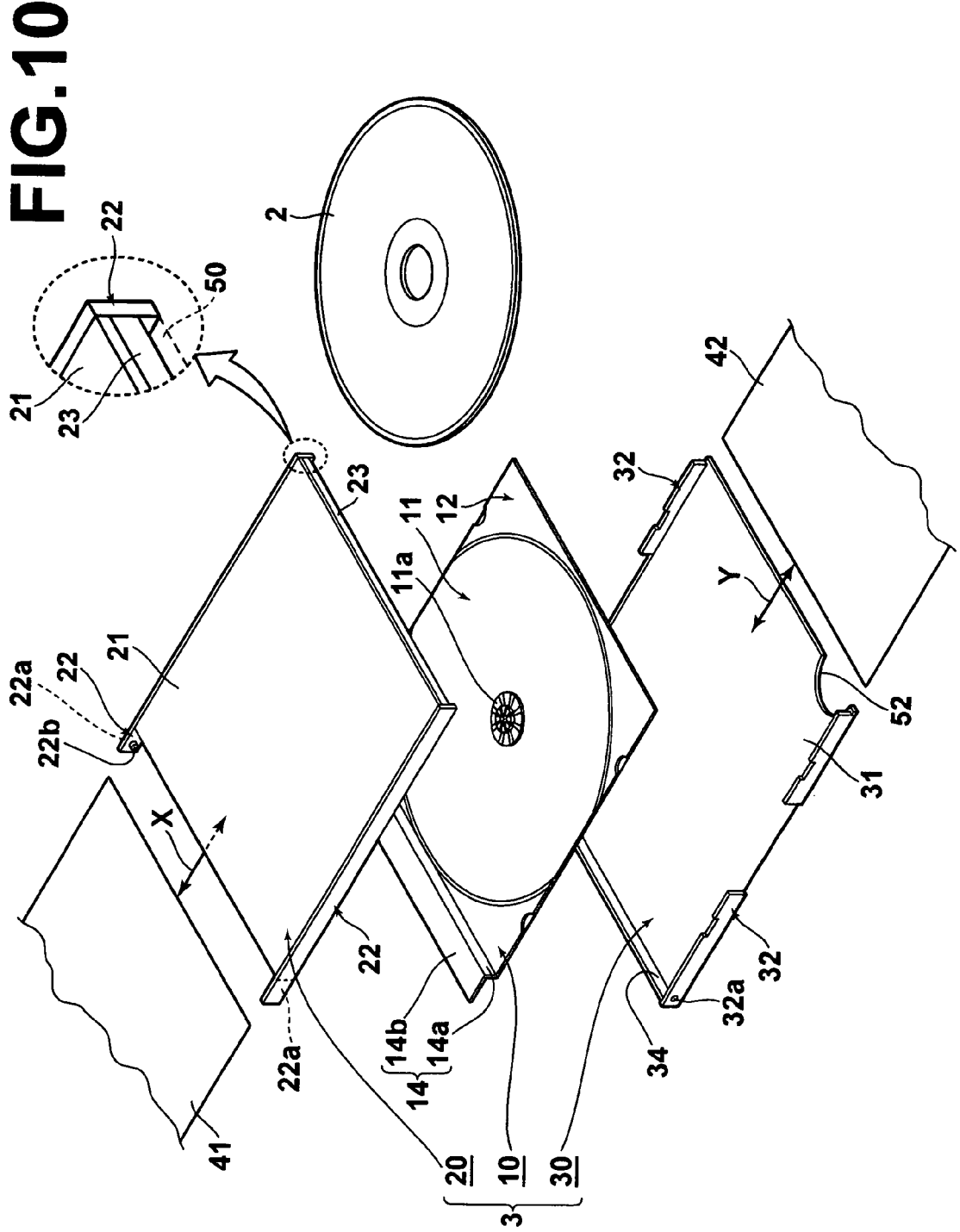

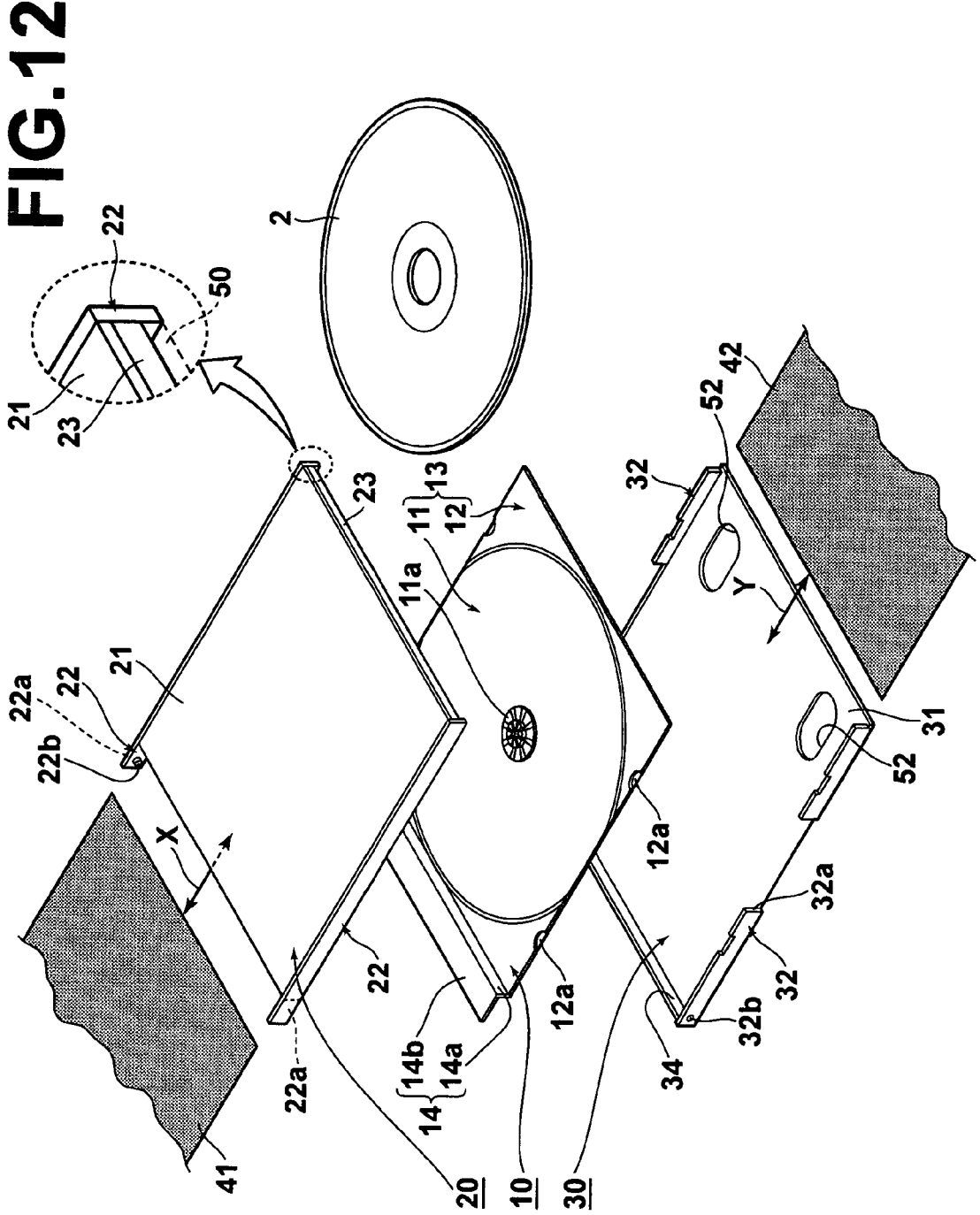

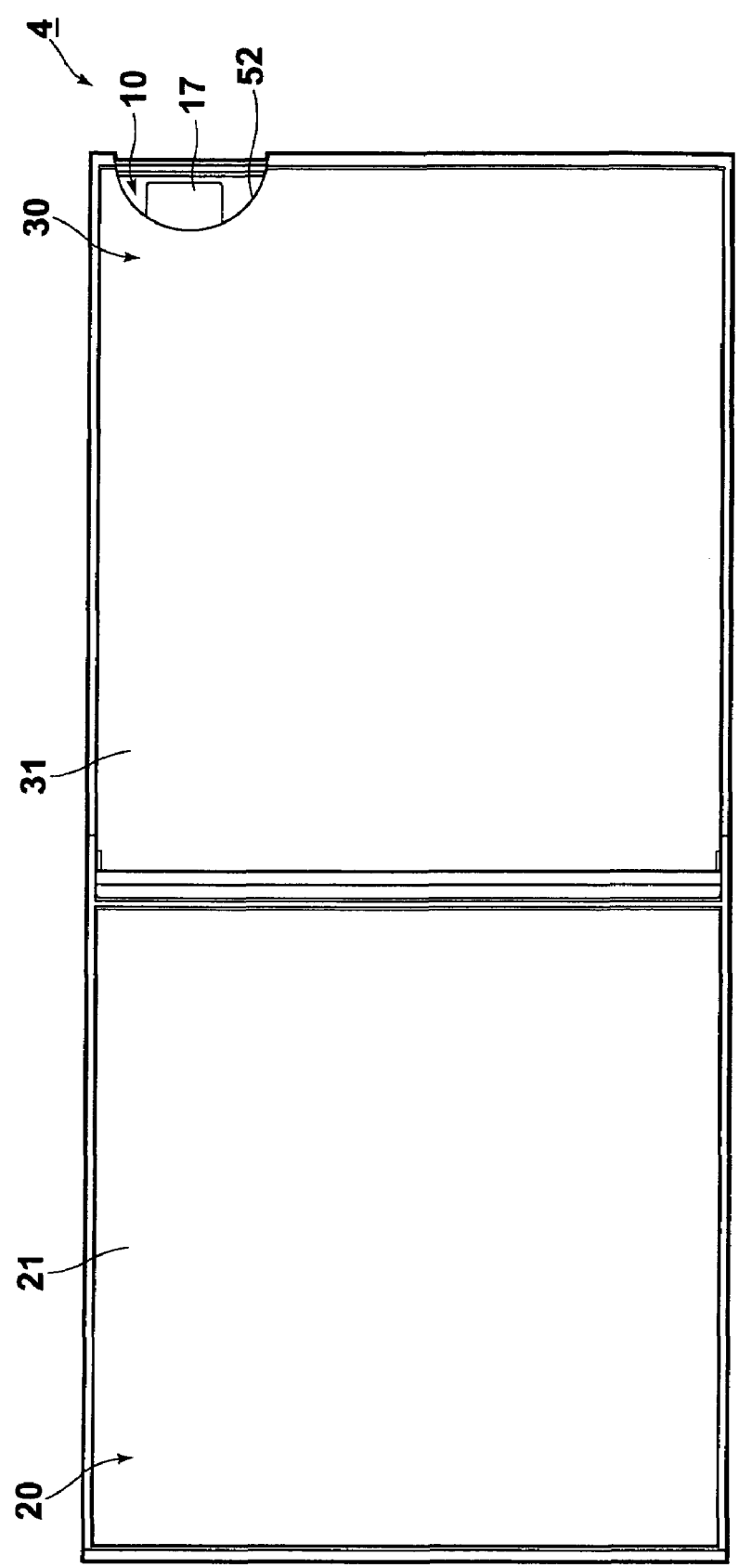

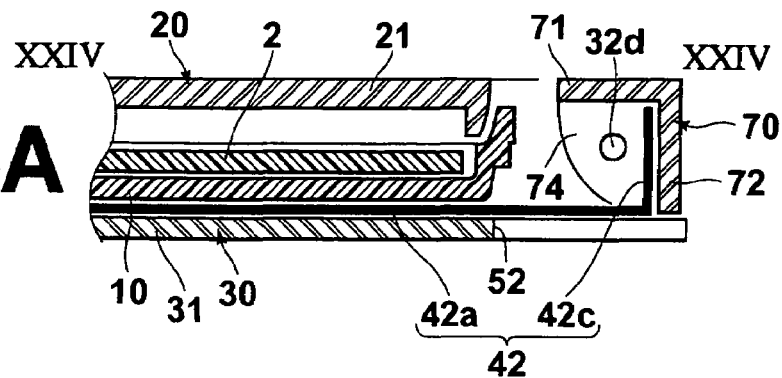
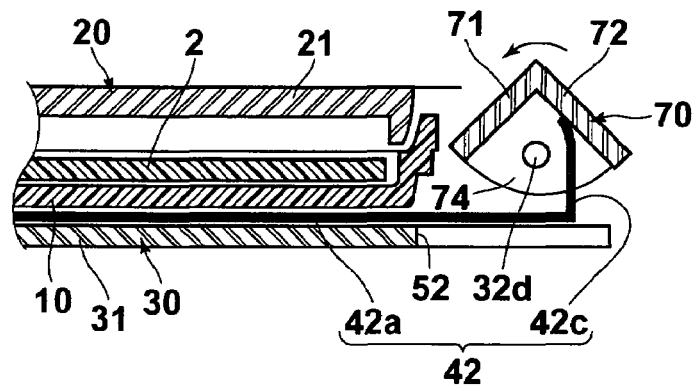
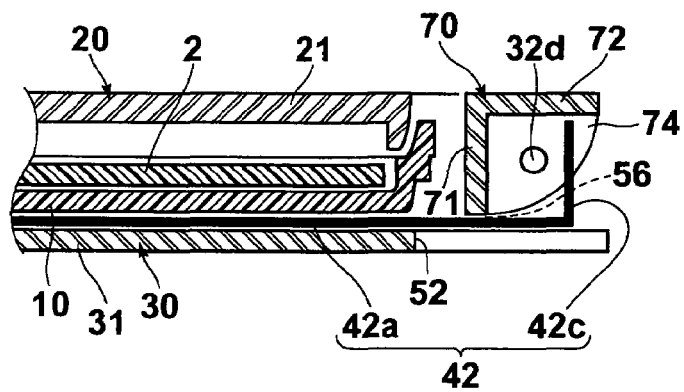
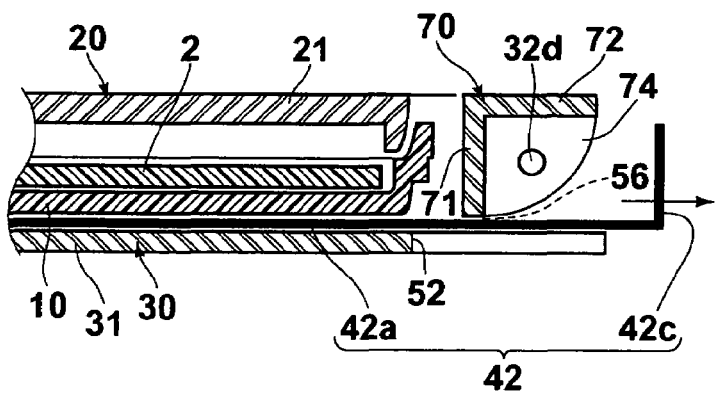

DISK HOUSING CASE WITH INDEX AND CONTACT OPENING THEREFOR

BACKGROUND OF THE INVENTION

1. Field of the Invention

The present invention relates to a disk housing case for housing recording media disks, such as CD's, DVD's, and BD's, and particularly to entry/exit structure of indexes therefor.

2. Description of the Related Art

Japanese Unexamined Patent Publication No. 10(1998)-106203 discloses a widely used disk housing case, for housing recording media disks, such as CD's (Compact Discs), DVD's (Digital Versatile Discs), and BD's (Blu-ray Discs). This disk housing case comprises: a disk tray, for removably holding the recording media disk; and a pair of case halves, which are linked to each other at one of the ends thereof to be openable and closable, for housing the disk tray.

Generally, in the type of disk housing case having a single disk tray, the disk tray is fitted into a rear case half of the pair of case halves. A front index and a rear index, in the form of cards or booklets, are attached to the front case half and the inner surface of the rear case half.

When data is recorded onto a recording medium disk, or when recorded data is edited, there are cases in which the content described on the rear index is edited, or the rear index itself is exchanged. The rear index is interposed between the disk tray and the rear case half, into which the disk tray is fitted. Therefore, insertion and removal of the rear index requires removal of the disk tray from the rear case half, causing the insertion and removal procedures to be troublesome.

In view of these circumstances, Japanese Utility Model No. 3094214 discloses a disk housing case, to which no indexes are attached. In this disk housing case, an index portion, which is formed as a rough surface, is provided on the outer surface of a case half, to enable writing and editing of content on the index portion with a pencil or the like.

However, the amount of information capable of being recorded by writing and editing of content on the roughened index portion is limited, and the index portion is not aesthetically pleasing.

SUMMARY OF THE INVENTION

The present invention has been developed in view of these circumstances. It is an object of the present invention to provide a disk housing case that enables insertion and removal of an index, which is interposed between a disk tray and a case half into which the disk tray is fitted, without removing the disk tray from the case half.

The disk housing case of the present invention comprises:

a disk tray, for removably holding a recording medium disk; and a pair of case halves, which are linked at first ends thereof so as to be openable and closable, for housing the disk tray;

the disk tray being fitted into at least one of the case halves;

a card type or a booklet type index being interposed between the disk tray and the case half, in which the disk tray is fitted;

an index entry/exit opening, which opens at least when the index is inserted or removed, being provided at the first ends or the second ends of the pair of case halves; and a contact opening, for enabling a finger or an index sliding member to contact the index to insert and remove the index, being provided in the disk tray and/or the case half, in which the disk tray is fitted.

In the disk housing case of the present invention, it is preferable that:

a side wall is formed on at least one of the pair of case halves, at the first end and/or the second end thereof; and the index entry/exit opening is a slit provided in the side wall.

In the disk housing case of the present invention, it is preferable that the disk tray comprises: a substantially discoid disk housing recess, where the recording media disk is fitted into and housed; and a flared portion that extends toward the exterior of the disk housing recess;

protrusive ribs, for pressing the index toward the case half, are provided on the flared portion; and the direction in which the ribs extend is parallel to the insertion/removal direction of the index.

In the disk housing case of the present invention, it is preferable that:

a stop member, for preventing inadvertent removal of the index, is provided in the case half, into which the disk tray is fitted, toward the side of the index entry/exit opening.

In the disk housing case of the present invention, it is preferable that:

there are no side walls at the first and/or second ends of the case halves, the opening formed due to the lack of the side walls serving as the index entry/exit opening; and wall portions, for partially sealing the gap between the disk tray and the index, while leaving space for the index to be inserted and removed therethrough, is provided on the disk tray toward the side of the index entry/exit opening.

In the disk housing case of the present invention, it is preferable that:

the disk tray comprises: a substantially discoid disk housing recess, where the recording media disk is fitted into and housed; and a flared portion that extends toward the exterior of the disk housing recess;

the contact opening is provided in the case half, into which the disk tray is fitted, at a portion thereof that faces the flared portion; and a support portion, for supporting the index from the side of the disk tray at least during insertion and removal of the index, is provided on the disk tray at a portion thereof that faces the contact opening.

In the disk housing case of the present invention, it is preferable that:

the contact opening is provided in the case half, into which the disk tray is fitted; and the portion of the index which is exposed through the contact opening is covered with a surface protective layer.

In the disk housing case of the present invention, it is preferable that:

the index entry/exit opening is provided in only one of the first ends and the second ends of the pair of case halves; and an index guiding portion having a curved surface to regulate the index when it is inserted through the index entry/exit opening, such that the leading end thereof curves along the curved surface to enable visual recognition thereof from the side of the case halves, is provided in the case half, into which the disk tray is fitted and/or the disk tray.

In the disk housing case of the present invention, it is preferable that:

there are no side walls at the first and/or second ends of the case halves, the opening formed due to the lack of the side walls serving as the index entry/exit opening; and a rotatable lid, which seals at least a portion of the index entry/exit opening without obstructing insertion or removal of the index through the index entry/exit opening, is rotatably supported by one of the pair of case halves.

An index entry/exit opening is provided at a linked side or at an end opposite the liked side of the pair of case halves in the disk housing case of the present invention. In addition, a contact opening, for enabling a finger or an index sliding member to contact the index to insert and remove the index, is provided in the disk tray and/or the case half, in which the disk tray is fitted.

Because of this construction, the index can be slid by contacting it with a finger or the like through the contact opening, while the disk tray is mounted in the case half, and the index can be inserted or removed through the index entry/exit opening. Accordingly, insertion and removal of an index, which is interposed between a disk tray and a case half into which the disk tray is fitted, are enabled without removing the disk tray from the case half.

BRIEF DESCRIPTION OF THE DRAWINGS

FIG. 3 is a plan view of the disk housing case of FIG. 1 in an open state.

FIG. 4 is a bottom view of the disk housing case of FIG. 1 in an open state.

FIG. 7 is a perspective view illustrating a design modification of the disk housing case of the first embodiment.

FIGS. 9A and 9B illustrate examples of design modifications of the disk housing case of the first embodiment.

FIG. 10 is an exploded perspective view of a disk housing case according to a second embodiment, in a closed state.

FIGS. 11A and 11B are perspective views of the disk housing case of FIG. 10 in a closed state, wherein FIG. 11A is a view from the front, and FIG. 11B is a view from the rear.

FIG. 12 is a perspective view that illustrates a design modification of the disk housing case according to the second embodiment.

FIG. 19 is a bottom view of the disk housing case of FIG. 15 in an open state.

FIGS. 24A, 24B, 24C, and 24D illustrate the movement of a rotating lid, and are sectional views taken along line XXIV-XXIV of FIG. 23.

DESCRIPTION OF THE PREFERRED EMBODIMENTS

Embodiment 1

A disk housing case according to a first embodiment of the present invention will be described with reference to FIGS. 1 through 6B. The disk housing case of the first embodiment is a case for housing a recording media disk, such as CD's (Compact Discs), DVD's (Digital Versatile Discs), and BD's (Blu-ray Discs). The first embodiment is characterized by the entry/exit structure of indexes.

Figure 1:
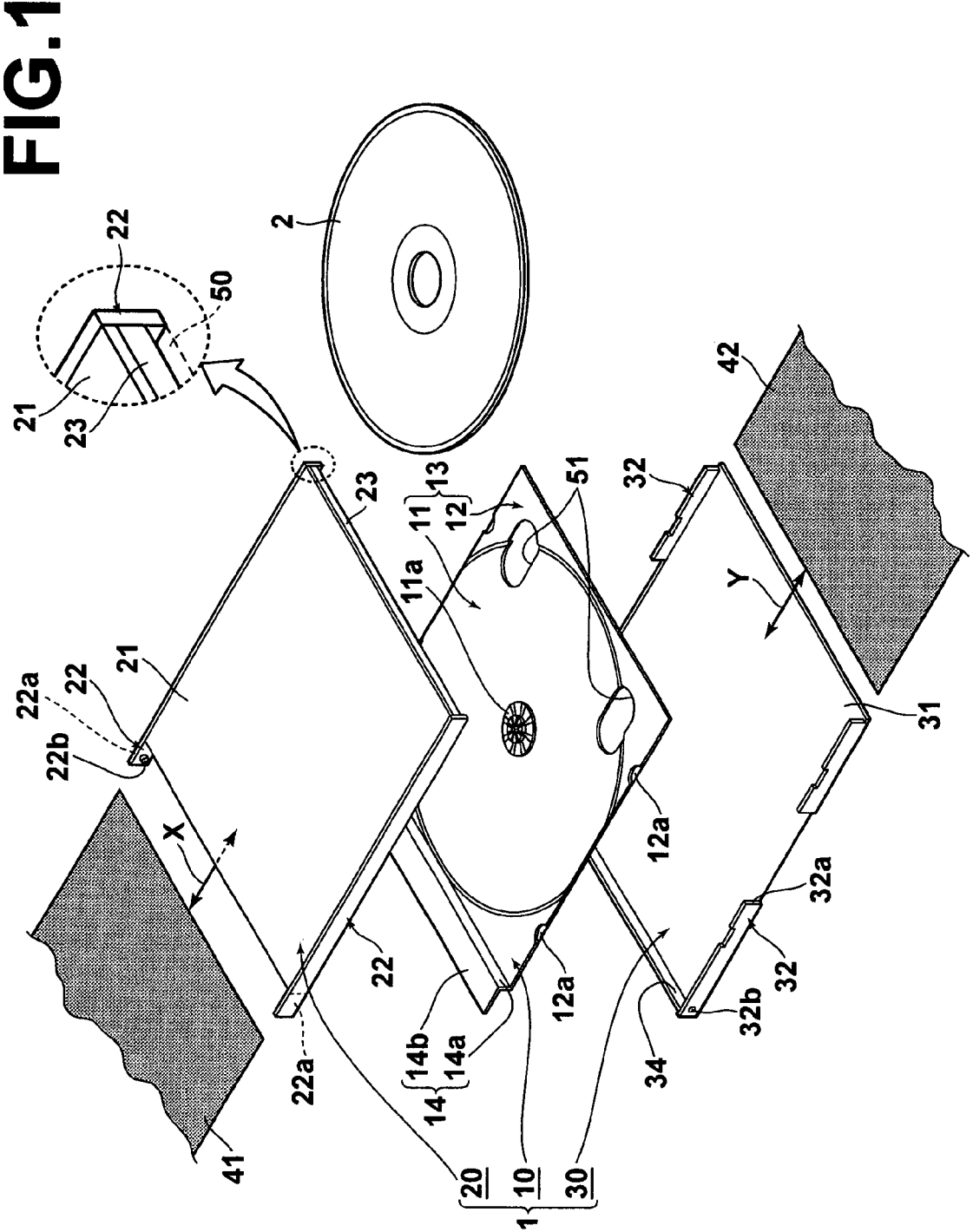
FIG. 1 is an exploded perspective view of a disk housing case according to a first embodiment, in a closed state.
Figure 2A:
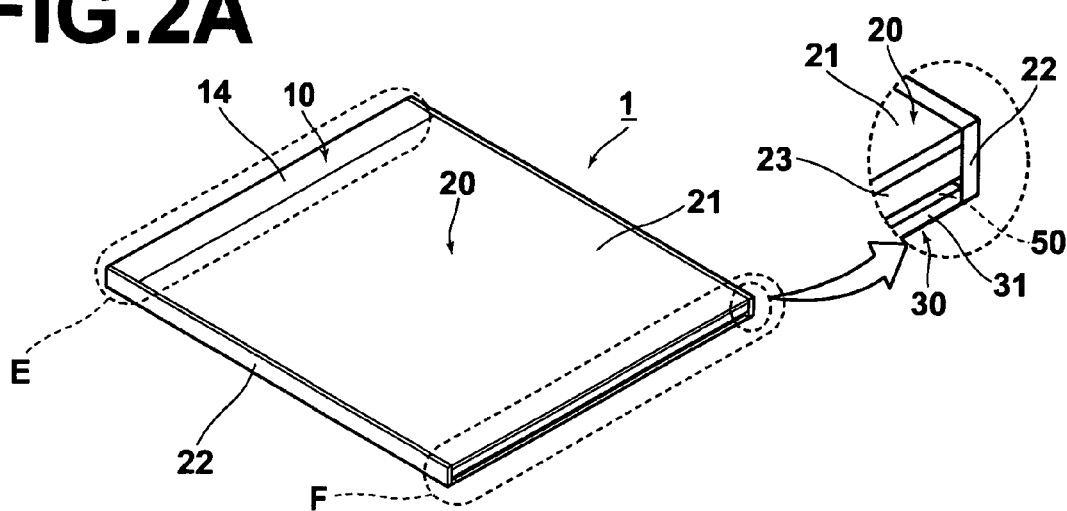
FIGS. 2A and 2B are perspective views of the disk housing case of FIG. 1 in a closed state.
Figure 2B:
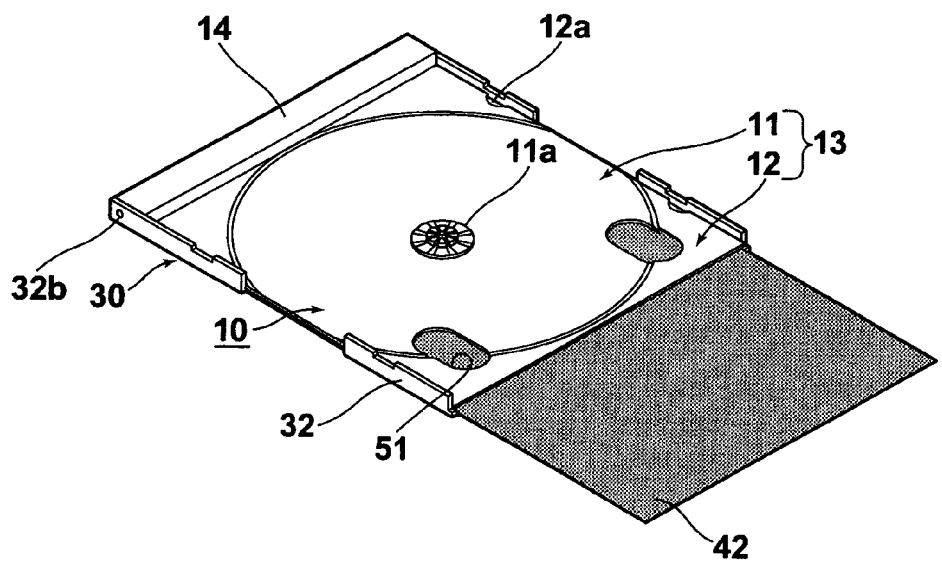
Figure 5A:
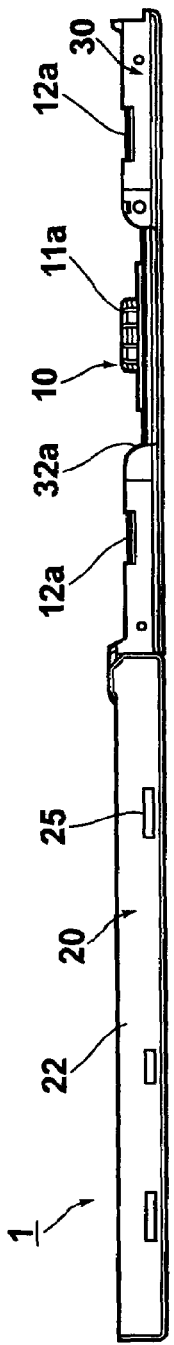
FIG. 5A is a front view of the disk housing case of FIG. 1.
Figure 5B:
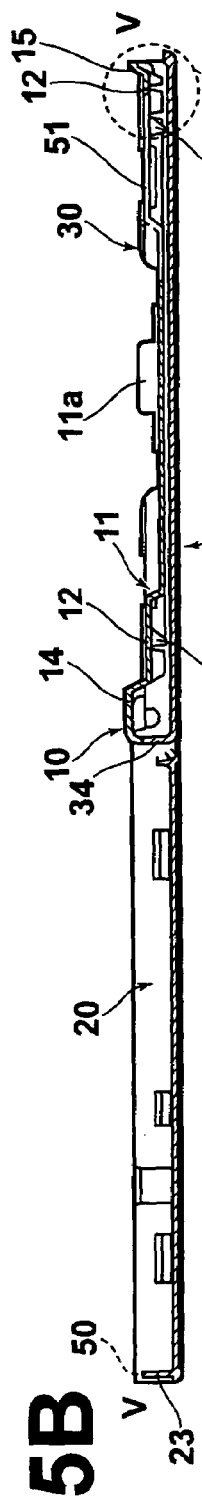
FIG. 5B is a sectional view taken along line V-V of FIG. 3.
Figure 5C:
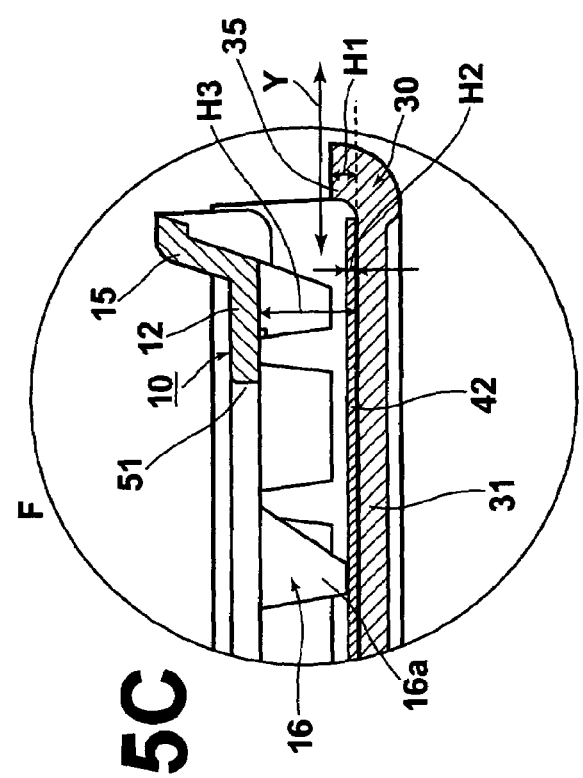
FIG. 5C is a magnified partial view of an end F of FIG. 5B.
Figure 6A:
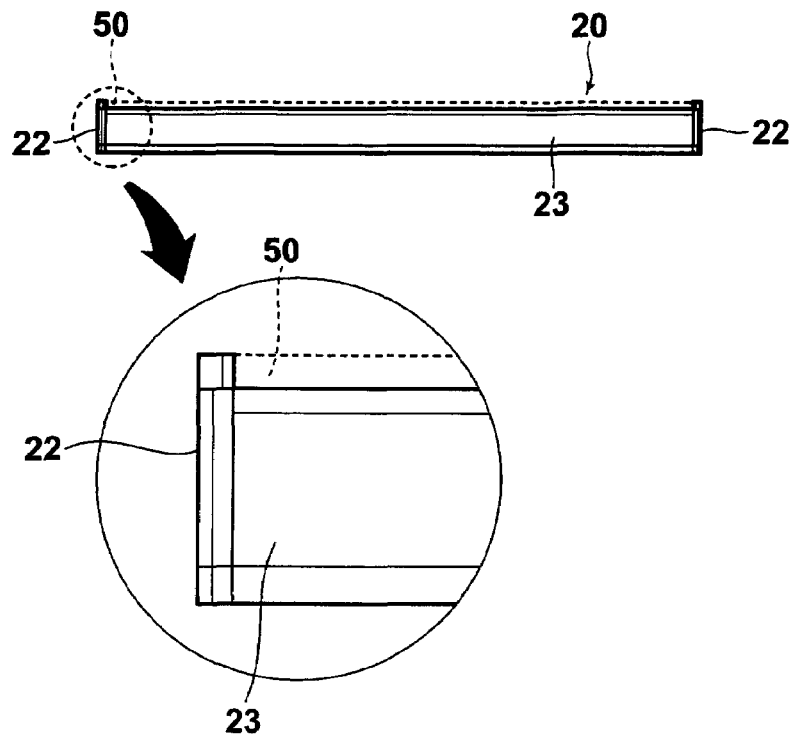
FIG. 6A is a left side view of the disk housing case of FIG. 1.
Figure 6B:
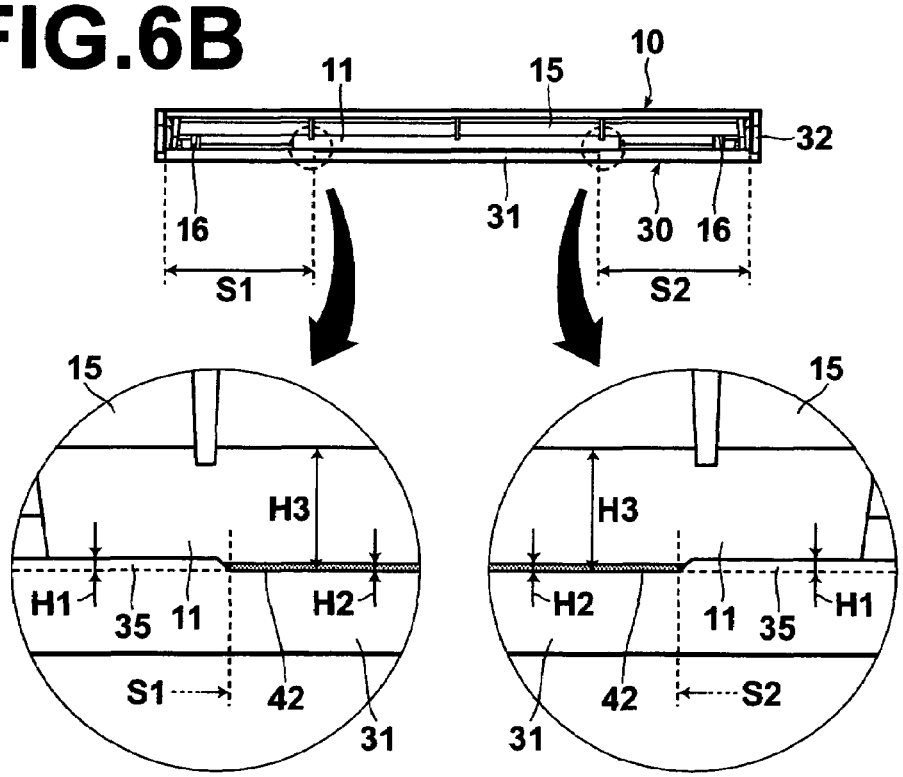
FIG. 6B is a right side view of the disk housing case of FIG. 1.

FIG. 1 is an exploded perspective view of a disk housing case 1 in a closed state. FIGS. 2A and 2B are perspective views of the disk housing case 1 in a closed state (a front case half is omitted in FIG. 2B). FIG. 3 is a plan view of the disk housing case 1 in an open state. FIG. 4 is a bottom view of the disk housing case 1 in an open state. FIG. 5A is a front view of the disk housing case 1 (a rear view is the same as the front view, and therefore is omitted). FIG. 5B is a sectional view taken along line V-V of FIG. 3. FIG. 5C is a magnified partial view of an end F of FIG. 5B. FIG. 6A is a left side view of the disk housing case 1, and FIG. 6B is a right side view of the disk housing case 1. A recording medium disk 2 and indexes 41 and 42 are omitted from the figures as appropriate.

As illustrated in FIGS. 1, 2A, and 2B, the disk housing case 1 of the present embodiment comprises: a disk tray 10, for removably holding the recording medium disk 2; a front case half 20; and a rear case half 30. The front case half 20 and the rear case half 30 are openable and closable, and the disk tray 10 is housed therein. The pair of case halves 20 and 30 are arranged such that they face each other with the disk tray 10 therebetween, and are linked at the left side ends (first ends) thereof in FIG. 1. The disk tray 10 is removably fitted into the rear case half 30.

The disk tray 10 and the case halves 20 and 30 that house the disk tray 10 are substantially rectangular in plan view, are formed of the same or different types of resin, with colors or patterns as desired. However, regarding at least the case halves 20 and 30, it is preferable that they are transparent, considering the need to visual recognize the contents of indexes.

A front side index 41 is interposed between the front case half 20 and the disk tray 10, and a rear side index 42 is interposed between the rear case half 30 and the disk tray 10. The indexes 41 and 42 are in the form of cards or booklets. The disk housing case 1 of the present embodiment is of a construction in which the rear side index 42 is insertable and extractable from the sides of the disk housing case 1. The details of this construction will be described later. The insertion/removal direction of the rear side index 42 is denoted by arrow Y in FIG. 1.

The indexes 41 and 42 have, for example, the title of the recording medium disk 2, a photograph, or lines in which the contents of the recording medium disk 2 can be edited, printed thereon.

The front case half 20 comprises: a plate like main body 21 that faces the disk tray 10; and a pair of side walls 22 that extend in an insertion/removal direction Y of the rear side index 42. The side walls 22 extend beyond the main body 21, and the extended portions are link arms 22a that link the front case half 20 with the rear case half 30.

The rear case half 30 comprises: a plate like main body 31 that faces the disk tray 10; and a pair of side walls 32 that extend in the insertion/removal direction Y of the rear side index 42. Cutout portions 32a are provided at the central portions of the side walls 32, to enable fingers to engage the disk tray 10, thereby facilitating removal thereof from the rear case half 30.

The areas of the main bodies 21 and 31 of the case halves 20 and 30 are set such that the side walls 22 of the front case half 20 are positioned outside the side walls 32 of the rear case half 30. That is, the areas of the main bodies 21 and 31 are set such that the rear case half 30 can be fitted within the front case half 20.

Protrusions 22b are provided on the inner surfaces of the pair of link arms 22a that constitute the front case half 20. Recesses 32b, for the tips of the protrusions 22b to enter, are provided in the outer surfaces of the pair of side walls 32 that constitute the rear case half 30. The pair of case halves 20 and 30 are linked at the first ends (left side ends in FIG. 1) thereof such that they are openable and closable, by the front case half 20 being pivotally supported on the rear case half 30 by the pair of protrusions 22b. The first ends will be referred to as "link ends" and denoted with reference letter E. The ends opposite the first end (right side ends in FIG. 1, second ends) will be denoted with reference letter F (refer to FIG. 2A).

The disk tray 10 comprises a tray main body 13, constituted by: a substantially discoid disk housing recess 11, into which the recording medium disk 2 is fitted and housed; and a flared portion 12 that extends toward the exterior of the disk housing recess 11. A disk damper 11a, for removably holding a central opening portion of the recording medium disk 2, is provided at the central portion of the disk housing recess 11.

An L-shaped portion 14, constituted by: a side wall 14a, which extends upward from the surface of the flared portion 12; and a flat portion 14b, which is continuous with the side wall 14a and parallel to the surface of the flared portion 12, is provided on the flared portion 12 toward the side of the link ends of the pair of case halves 20 and 30. The flat portion 14b is positioned between the pair of link arms 22a, and becomes coplanar with the main body 21 of the front case half 20 when the pair of case halves 20 and 30 are in a closed state. As illustrated in FIGS. 5B and 5C, a side wall 15, which is substantially symmetrical with respect to the side wall 14, is provided on the flared portion 12 at the end thereof opposite the link ends of the case halves 20 and 30.

(Index Entry/Exit Structure)

Hereinafter, the entry/exit structure of the index, and the manner in which the index is inserted and removed will be described.

As illustrated in FIG. 3, three substantially semicircular engaging pieces 25, for engaging and holding the front side index 41, are provided on each of the pair of side walls 22 of the front case half 20, parallel to the surface of the main body 21. As illustrated in FIG. 1, there is no side wall at the side of the link end E of the front case half 20, thereby forming an opening. This configuration enables the front side index 41 to be inserted and removed from the open link end E of the front case half 20, by sliding the index 41 between the main body 21 and the engaging pieces 25. An arrow X denotes the insertion/removal direction of the front side index 41. A side wall 34 is provided at the link end E of the rear case half 30, and recesses 12a, into which the engaging pieces 25 enter, are formed in the flared portion 12 of the disk tray 10.

There are no engaging pieces for engaging an index on the rear case half 30, and the rear side index 42 is to be inserted into the gap between the main body 31 of the rear case half 30 and the disk housing recess 11 of the disk tray 10. There is a space between the flared portion 12 of the disk tray 10 and the main body 31 of the rear case half 30. Therefore, protrusive ribs 16, for pressing the rear side index 42 toward the rear case half 30, are provided on the flared portion 12. As illustrated in FIG. 3, four protrusive ribs 16 are provided in the vicinity of the corners of the flared portion 12, close to the recesses 12a.

As illustrated in FIG. 5C, each protrusive rib 16 is a plate-like protrusions having a trapezoidal surface 16a that constricts from the side of the front case half 20 to the side of the rear case half 30. In the present embodiment, the direction that the protrusive ribs 16 extend is parallel to the insertion/removal direction Y of the rear side index 42.

In the present embodiment, a slit 50, which is an index entry/exit opening through which the rear side index 42 is inserted and removed, is provided at the end F, opposite from the link end E of the pair of case halves 20 and 30.

Specifically, as illustrated in FIG. 1 and FIG. 2, there is no sidewall at the end F of the rear case half 30, thereby creating an opening. A side wall 23 is provided at the end F of the front case half 20. The side wall 23 is formed to be lower than the side walls 22, which extend parallel to the insertion/removal direction Y of the rear side index 42. Thereby, the slit 50 is formed between the side wall 23 and the main body 31 of the rear case half 30 when the pair of case halves 20 and 30 are in a closed state. The height of the side wall 23 is set such that the height of the slit 50 is greater than the thickness of the rear side index 42, while preventing entry of dust and the like into the disk housing case 1.

In the present embodiment, contact openings 51, for enabling a finger, preferably a thumb, or an index sliding member, such as a pen, to contact the rear side index 42 to insert and remove the index, are provided in the disk tray 10.

The contact openings 51 are provided at two locations in the disk tray 10, toward the side of the slit 50. Both of the contact openings 51 are formed so as to straddle the disk housing recess 11 and the flared portion 12 of the disk tray 10.

In the present embodiment, the rear side index 42 is inserted and removed in the following manner. First, the pair of case halves 20 and 30 are opened. Then, the recording media disk is removed. Next, a finger or an index sliding member is caused to contact the rear side index 42 through a contact opening 51, to slide the rear side index 42 in or out through the slit 50 (index entry/exit opening) provided at the ends F of the pair of case halves 20 and 30.

As illustrated in FIGS. 5C and 6B, stoppers 35, for preventing inadvertent removal of the rear side index 42, are provided in the rear case half 30 toward the end F, at which the index entry/exit opening is provided. The stoppers 35 are ridges provided at the end of the main body 31 of the rear case half 30. The stoppers 35 are formed at the right and left sides of the central portion of the end F, when viewed from the index entry/exit opening. Reference letters S1 and S2 denote the regions at which the stoppers 35 are formed. The stoppers 35 are integrally formed with the main body 31 of the rear case half 30.

The height H1 of the stoppers 35 is set such that insertion and removal of the rear side index 42 are not greatly impeded, while inadvertent removal thereof is prevented. Preferably, the height H1 is greater than a thickness H2 of the rear side index 42 and less than a distance H3 between the flared portion 12 of the disk tray 10 and the main body 31 of the rear case half 30.

The disk housing case 1 of the present embodiment is constructed as described above.

The disk housing case 1 of the present embodiment is of a construction, in which: the slit 50, which is the index entry/exit opening, is provided in the pair of case halves 20 and 30 at the ends F thereof, which is opposite to the link ends; and the contact openings 51, for enabling a finger or an index sliding member to contact the rear side index 42 to insert and remove the index, are provided in the disk tray 10.

In this disk housing case 1 as described above, a finger can contact the rear side index 42 through a contact opening 51 to slide the rear side index 42 while the disk tray 10 is fitted in the rear case half 30. Thereby, the rear side index 42 can be inserted and removed through the slit 50, provided at the ends F of the pair of case halves 20 and 30. Accordingly, insertion and removal of the rear side index 42, which is interposed between the disk tray 10 and the rear case half 30, in which the disk tray 10 is fitted, can be realized without removing the disk tray 10 from the rear case half 30.

Further, the protrusive ribs 16 are provided on the flared portion 12 of the disk tray 12 to press the rear side index 42 toward the rear case half 30. The direction in which the protrusive ribs 16 extend is parallel to the insertion/removal direction Y of the rear side index 42. This direction is perpendicular to the direction in which protrusive ribs of conventional disk housing cases extend. By this configuration, the width of the portion of the protrusive ribs 16 that the rear side index passes through is small when viewed from the index entry/exit opening, as illustrated in FIG. 6B. Therefore, there is no possibility that sliding motion of the rear side index 42 will be prevented by the presence of the protrusive ribs 16. The rear side index 42 can slide smoothly along the direction that the protrusive ribs 16 extend. In this manner, smooth insertion and removal of the rear side index 42 is realized, because the rear side index 42 slides smoothly.

Still further, in the present embodiment, a configuration is adopted wherein the stoppers 35, for preventing inadvertent removal of the rear side index 42, are provided in the rear case half 30, toward the end F opposite from the link end thereof. Therefore, there is no possibility that the rear side index 42 will be inadvertently removed through the slit 50, improving the handling properties of the disk housing case 1.

Particularly, in the present embodiment, the stoppers 35 are not formed across the entire end of the main body 31 of the rear case half 30, but are formed on the left and right sides thereof as viewed from the index entry/exit opening and not at the central portion. By this configuration, the rear side index 42 is capable of being inserted and removed without riding over the stopper 35 at the central portion. Accordingly, the effect of preventing inadvertent removal of the rear side index 42 is sufficiently secured, while not impeding insertion and removal thereof.

Modifications to the First Embodiment

In the first embodiment, the slit 50, which is the index entry/exit opening, is formed by not providing a side wall at the end F of the rear case half 30, and by providing the side wall 23, which is shorter than the side walls 22, at the end F of the front case half 20. However, the present invention is not limited to such a configuration. For example, the side wall 23 may not be provided at the end F of the front case half 20 and a side wall 33 may be provided at the end F of the rear case half 30 having the slit 50 formed therein, as illustrated in FIG. 7.

In the first embodiment, two contact openings 51 are provided in the disk tray 10 toward the side of the index entry/exit opening such that they straddle the disk housing recess 11 and the flared portion 12. By this configuration, both thumbs can contact the rear side index 42 through the contact openings 51. In addition, because the areas of the contact openings are comparatively large, fingers can move within the contact openings 51, facilitating insertion and removal of the rear side index 42.

However, the location, shape, and number of contact openings 51 are not limited to those of the first embodiment, and may be set as appropriate. FIGS. 8A, 8B, 8C, 8D, 8E, and 8F illustrate other formation patterns of the contact openings 51.

FIGS. 8A, 8B, 8C, and 8F illustrate examples in which the contact openings 51 are formed only in the flared portions 12 of the disk tray 10. In these examples, the contact openings 51 are not formed in the disk housing recess 11. Therefore, the rear side index 42 can be inserted and removed without removing the recording medium disk 2 from the disk tray 10.

Figure 8A:
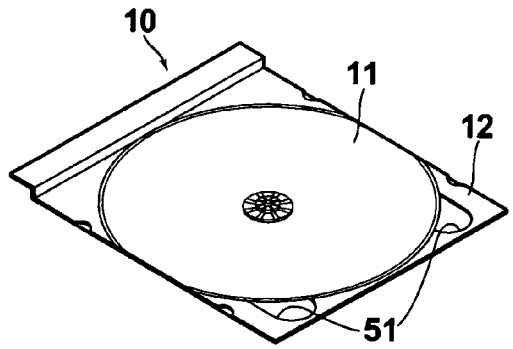
FIGS. 8A, 8B, 8C, 8D, 8E, and 8F illustrate examples of design modifications of the disk housing case of the first embodiment.
Figure 8E:
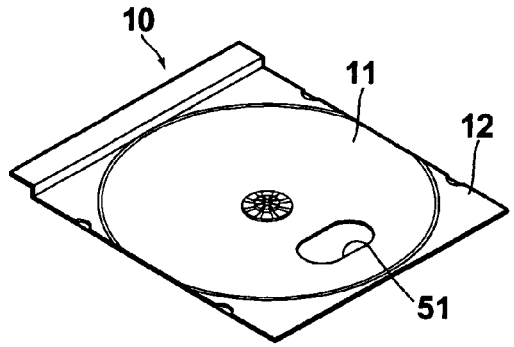
Figure 8B:
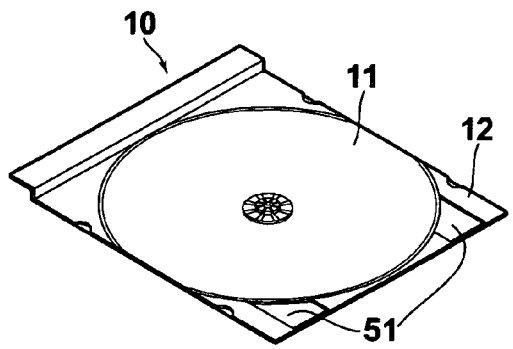
Figure 8F:
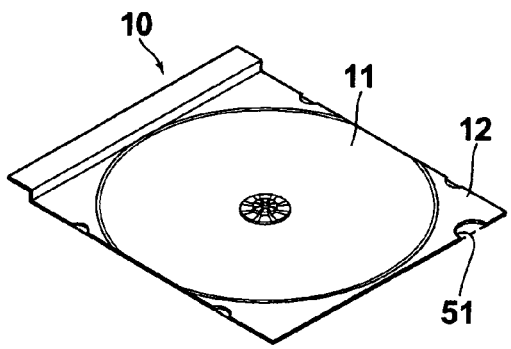
Figure 8C:
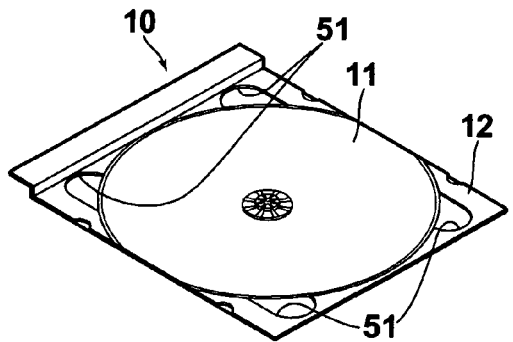

In the case that the rear side index 42 is of the bent type, comprising: a main index portion that faces the main surface of the rear case half 30 (the surface of the main body 31); and a sub-index portion which is viewed from the side of the link ends of the case halves 20 and 30, the example of FIG. 8C is preferable. This is because the contact openings 51 are provided toward the side of the index entry/exit opening and toward the side of the link ends, facilitating insertion of the sub-index portion. In the example of FIG. 8F, the contact opening 51 is open toward the index entry/exit opening. Therefore, the edge of the rear side index 42 can be directly grasped during insertion and removal.

Figure 8D:
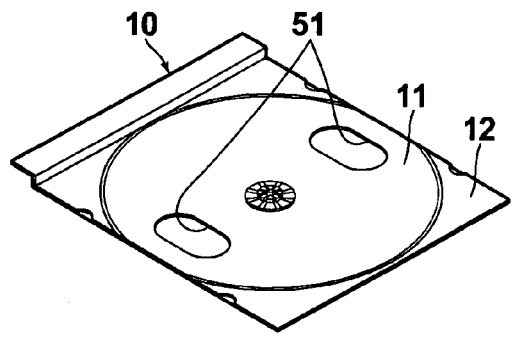

FIGS. 8D and 8E illustrate examples in which the contact openings are provided only in the disk housing recess 11 of the disk tray 10. In these examples, the contact openings 51 are not exposed when the recording medium disk 2 is housed in the disk housing recess 11. Therefore, index preservation properties (anti soil properties, anti corrosion properties, and the like) are favorable. In addition, the contact openings 51 are not exposed to users when the recording medium disk 2 is housed in the disk housing recess 11. Therefore, the outer appearance of the disk housing case 1 in an open state is the same as that of conventional disk housing cases, which is preferable in terms of aesthetics.

In the example of FIG. 8E, in which a single contact opening 51 is provided in the disk housing recess 11 toward the side of the index entry/exit opening, sufficient index insertion/removal properties are secured, while suppressing the total area of the contact opening 51. Therefore, the mechanical strength of the disk tray 10 is improved.

In addition, marks 60 that indicate the insertion/removal direction Y of the rear side index 42 (for example, arrows or the word "PUSH") may be provided on the rear side index 42 at the portions corresponding to the contact openings 51 and/or the disk tray 10. By this configuration, the insertion/removal direction Y of the rear side index 42 can be easily recognized by users.

As will be described in the second embodiment, the contact openings may be provided in the rear case half 30. In this case, the marks 60 may be provided on the rear side index 42 and/or the rear case half 30.

The first embodiment is a disk housing case 1, in which the disk tray 10 is fitted only in the rear case half 30. The present invention is applicable to disk housing cases, in which the disk tray 10 is fitted in at least one of the pair of case halves 20 and 30.

Second Embodiment

Figure 11A:
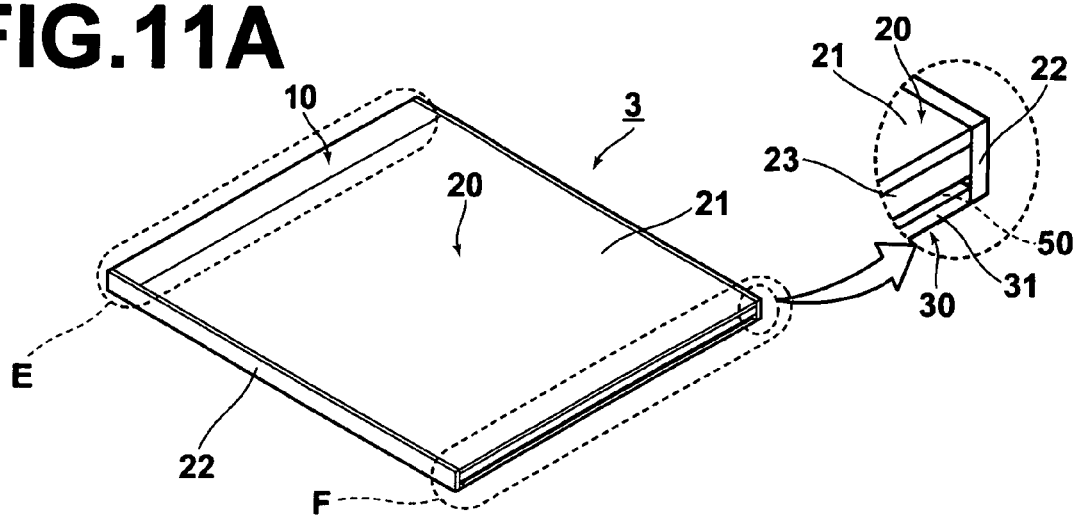
Figure 11B:
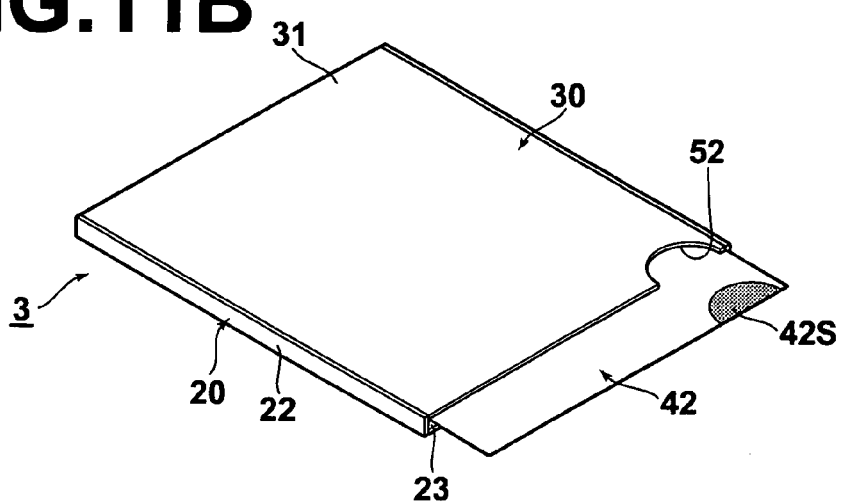

A disk housing case 3 according to a second embodiment of the present invention will be described with reference to FIGS. 10, 11A, and 11B. The basic structure of the disk housing case 3 is the same as that of the disk housing case 1 of the first embodiment. Structural elements which are the same as those of the first embodiment will be denoted with the same reference numerals, and detailed descriptions thereof will be omitted. FIG. 10 is an exploded perspective view of the disk housing case 3 in a closed state. FIGS. 11A and 11B are perspective views of the disk housing case 3 in a closed state, wherein FIG. 11A is a view from the front, and FIG. 11B is a view from the rear.

The disk housing case 3 is configured such that the rear side index 42 is insertable and removable through the slit 50 (index entry/exit opening), which is provided at the ends F opposite to the link ends of the pair of case halves 20 and 30, in a manner similar to that of the first embodiment. That is, similar to the first embodiment, there is no side wall at the end F of the rear case half 30, thereby creating an opening. In addition, the side wall 23 is provided at the end F of the front case half 20. The side wall 23 is formed to be lower than the side walls 22, which extend parallel to the insertion/removal direction Y of the rear side index 42. Thereby, the slit 50 is formed between the side wall 23 and the main body 31 of the rear case half 30 when the pair of case halves 20 and 30 are in a closed state.

In the first embodiment, the contact openings were provided in the disk tray 10. In contrast, in the second embodiment, a contact opening 52 is provided in the rear case half 30, at a position that faces the flared portion 12 of the disk tray. The contact opening 52 enables a finger or the like to contact the rear side index 42. The contact opening 52 is shaped as a substantially semicircular cutout at the end of the rear case half 30 toward the index entry/exit opening.

In the present embodiment, a portion of the rear side index 42 is always exposed through the contact opening 52. Therefore, the portion of the rear side index 42 which is exposed through the contact opening 52 is covered by a surface protective layer 42S, as illustrated in FIG. 11B.

The surface protective layer 42S protects the exposed portion of the rear side index 42, to suppress soiling and damage (peeling of printed matter and the like) thereof. Accordingly, it is preferable that the surface protective layer 42S has anti-soiling and anti-abrasion properties. Specific preferred examples include resins, such as polyethylene, polypropylene, polyvinyl chloride, and polystyrene. The surface protective layer 42S may be formed, for example, by: (1) coating the index 42 with a liquid that contains resins by a dispensing method; (2) attaching a resin film, formed in the shape of the surface protective layer (a semicircle in the illustrated example) onto the index 42 with an adhesive; or (3) directly attaching a resin film onto the index 42 by laminating or the like.

The disk housing case 3 of the present embodiment is constructed as described above.

The disk housing case 3 of the present embodiment is of a construction, in which: the slit 50, which is the index entry/exit opening, is provided in the pair of case halves 20 and 30 at the ends F thereof, which is opposite to the link ends; and the contact openings 52, for enabling a finger or the like to contact the rear side index 42 to insert and remove the index, are provided in the rear case half 30.

In this disk housing case 3 as described above, a finger can contact the rear side index 42 through the contact opening 52 to slide the rear side index 42 while the disk tray 10 is fitted in the rear case half 30. Thereby, the rear side index 42 can be inserted and removed through the slit 50, provided at the ends F of the pair of case halves 20 and 30. Accordingly, insertion and removal of the rear side index 42, which is interposed between the disk tray 10 and the rear case half 30, in which the disk tray 10 is fitted, can be realized without removing the disk tray 10 from the rear case half 30.

In the first embodiment, it was necessary for the pair of case halves 20 and 30 to be in an open state to perform insertion and removal of the rear side index 42. In contrast, insertion and removal of the rear side index 42 can be performed with the pair of case halves in either the open or closed states in the present embodiment.

Further, in the disk housing case 3 of the present embodiment, the portion of the rear side index 42, which is exposed through the contact opening 52, is covered by the surface protective layer 42S. Therefore, soiling and damage to the exposed portion of the rear side index 42 is suppressed, and the exposed portion is favorably protected.

In the present embodiment, the region at which the surface protective layer 42S is formed matches the region at which the contact opening 52 is open. Similar advantageous effects can be obtained as long as at least the portion of the rear side index 42, which is exposed through the contact opening 52, is covered by the surface protective layer 42S. However, it is preferable that the surface protective layer 42S is formed in the minimum required region, from the viewpoint of costs and the degree of freedom in editing the contents of the rear side index 42. That is, it is preferable that the surface protective layer 42S is formed only at the portion of the rear side index 42 which is exposed through the contact opening 52 and the vicinity thereof, that may be exposed due to positional displacement of the rear side index 42 within the rear case half 30.

Modifications to the Second Embodiment

In the second embodiment, the slit 50, which is the index entry/exit opening, is formed by not providing a side wall at the end F of the rear case half 30, and by providing the side wall 23, which is shorter than the side walls 22, at the end F of the front case half 20, similar to the configuration of the first embodiment. However, the present invention is not limited to such a configuration. For example, the side wall 23 may not be provided at the end F of the front case half 20 and a side wall 33 may be provided at the end F of the rear case half 30 having the slit 50 formed therein, as illustrated in FIG. 7.

As the second embodiment, a configuration has been described, in which a single contact opening 52 is formed as a substantially semicircular cutout at the end of the rear case half 30 toward the index entry/exit opening. The location, shape, and number of the contact opening 52 are not limited to those of the second embodiment, and can be set as appropriate. For example, as illustrated in FIG. 12, two contact openings 52 may be provided in the rear case half 30 at portions that face the flared portion 12 of the disk tray 10. Further, the contact openings 51 as described in the first embodiment may also be provided in the disk tray 10, in addition to the contact openings 52 in the rear case half 30.

In the second embodiment, a case has been described in which the rear side index is of a non-bent type. However, the rear side index 42 may be of the bent type, comprising: a main index portion that faces the main surface of the rear case half 30 (the surface of the main body 31); and a sub-index portion which is viewed from the side opposite that of the link ends of the case halves 20 and 30.

Figure 13A:
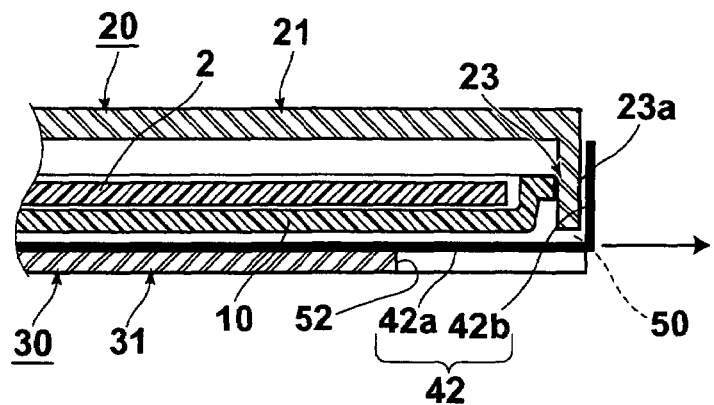
FIGS. 13A, 13B, and 13C are sectional views of design modifications of the disk housing cases according to the second embodiment.
Figure 13B:
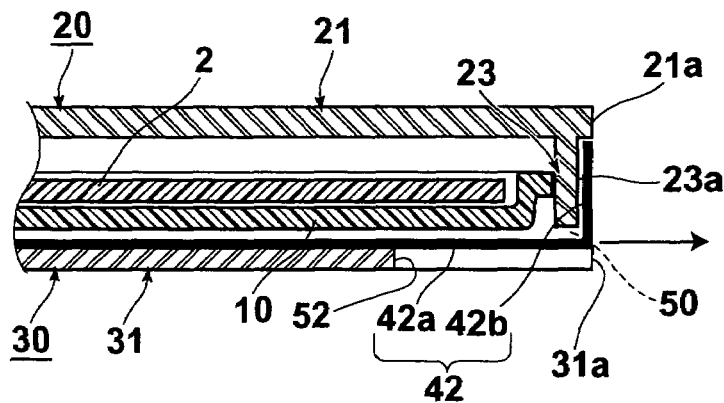
Figure 13C:
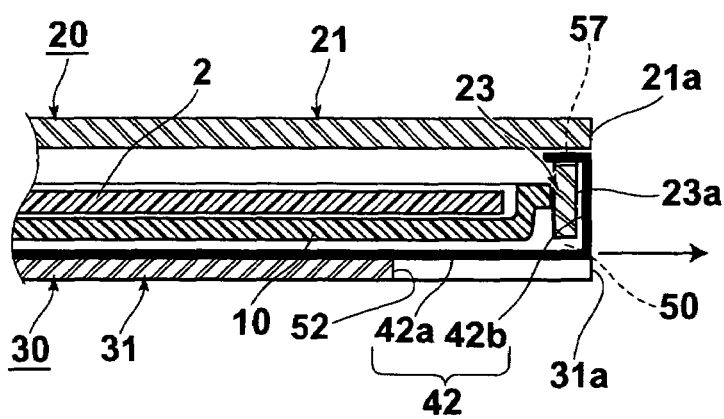

Design modifications, in the case that the rear side index 42 comprises the sub-index portion 42b, will be described with reference to FIGS. 13A, 13B, and 13C. FIGS. 13A, 13B, and 13C are sectional views of disk housing cases in closed states, taken along the thickness directions thereof.

As illustrated in FIG. 13A, in the case that the rear side index 42 comprises a sub-index portion 42b, the sub-index portion 42b may be pulled out of the slit 50, then bent 90° such that it is arranged along the outer surface 23a of the side wall 23. In this case, the sub-index portion 42b is not housed within the disk housing case. Therefore, the rear side index 42 can be inserted and removed while the pair of case halves are in a closed state, as in the second embodiment.

As illustrated in FIG. 13B, the end 21a of the main body 21 of the front case half 20 and the end 31a of the main body 31 of the rear case half 30 may be caused to protrude slightly beyond the outer surface 23a of the side wall 23. This configuration is preferable, because the sub-index 42b can be housed within the space formed by the protrusive ends 21a and 31a, thereby protecting the sub-index portion 42b.

Further, as illustrated in FIG. 13C, it is preferable that a slit 57 is formed in the side wall 23 toward the side of the main body 21. In this case, the leading end of the sub-index portion 42b is bent 90° and inserted into the slit 57. This configuration favorably fixes the leading end of the sub-index portion 42b, and suppresses separation thereof from the side wall 23.

A configuration may be adopted, wherein the sub-index portion 42b is arranged along the inner surface of the side wall 23 of the front case half 20. In this case, the sub-index portion 42b may be pulled out of the slit 50 with the pair of case halves 20 and 30 in an open state, prior to inserting or removing the rear side index 42.

The rear side index 42 may alternatively be of a bent type, comprising: the main index portion 42a; and a sub-index portion 42c which is arranged to face the side wall 34 of the rear case half 30, to be viewed from the link ends of the pair of case halves 20 and 30.

Figure 14A:
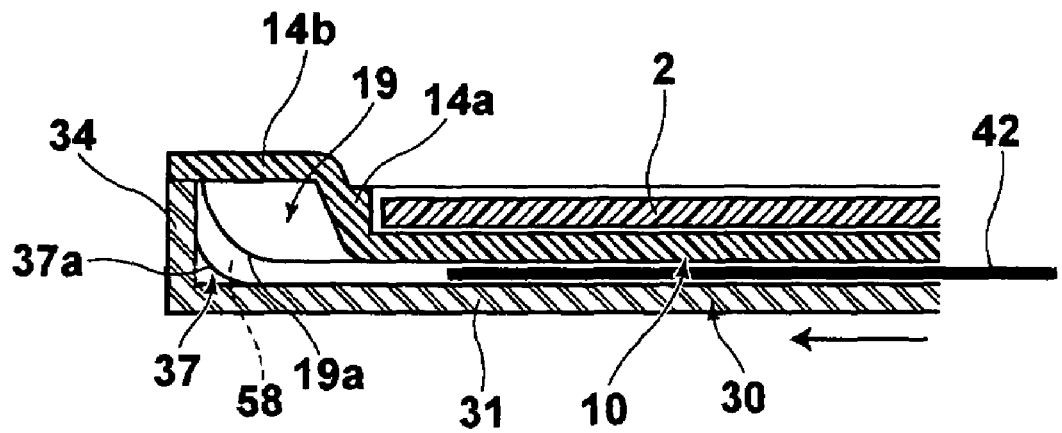
FIGS. 14A and 14B are sectional views of design modifications of the disk housing case according to the second embodiment.
Figure 14B:
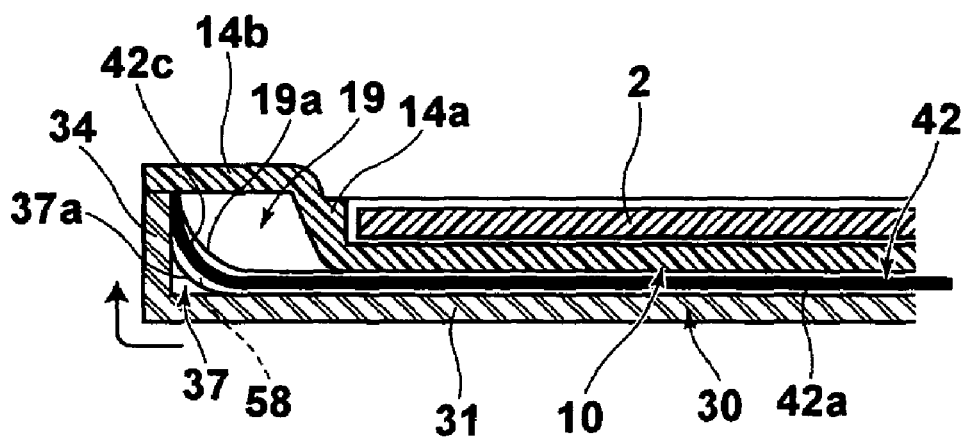

Design modifications, in the case that the rear side index 42 comprises the sub-index portion 42c, will be described with reference to FIGS. 14A and 14B. FIGS. 14A and 14B are sectional views of a disk housing case in a closed state, taken along the thickness directions thereof.

As illustrated in FIGS. 14A and 14B, in the case that the rear side index 42 comprises the sub-index portion 42c, guide ribs 19, each having a curved surface 19a, may provided on the inner surface of the flat portion 14b of the disk tray 10. Guide ribs 37, each having a curved surface 37a, may be provided at the corner of the main body 31 and the sidewall 34 of the rear case half 30. A plurality of sets of the guide ribs 19 and the guide ribs 37 may be provided along the direction parallel to the surface of the side wall 34. The curved surfaces 19a and 37a of the guide ribs 19 and 37 are parallel to each other, and an index insertion space 58 is formed between the curved surfaces 19a and the curved surfaces 37a. The guide ribs 19 and 37 serve as an index guide, for guiding the sub-index portion 42c, which is the leading end of the rear side index 42 inserted through the slit 50 (index entry/exit opening).

Insertion and removal of the sub-index portion 42c is facilitated by the provision of the guide ribs 19 and 37, which enables the sub index portion 42c to be curved during insertion thereof. A configuration may be adopted wherein only one of the guide ribs 19 and the guide ribs 37 are provided. In addition, the index guide is not limited to being ribs.

The design modifications illustrated in FIGS. 13A, 13B, 13C, 14A, and 14B are also applicable to the disk housing case 1 of the first embodiment.

Third Embodiment

Figure 15:
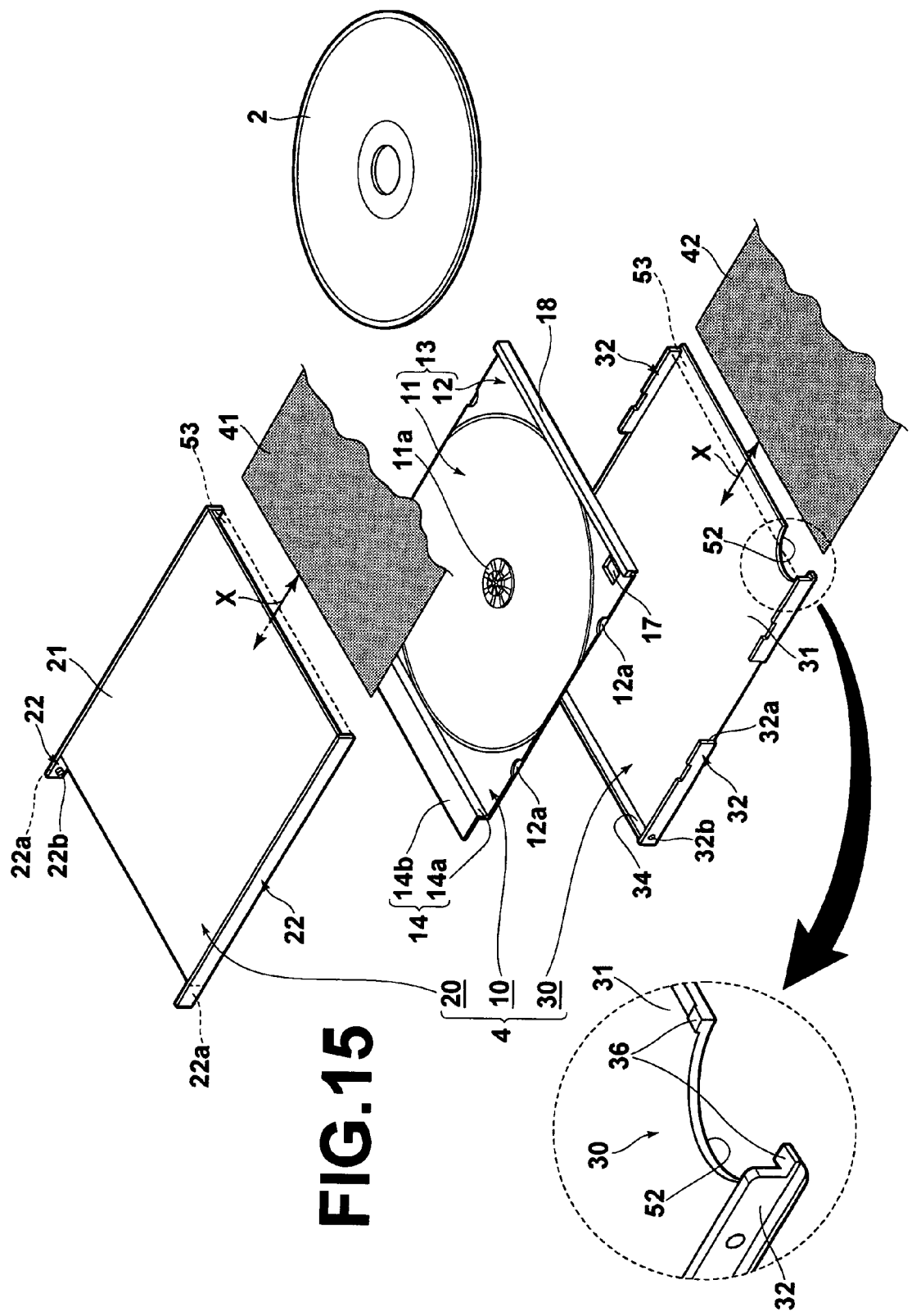
FIG. 15 is an exploded perspective view of a disk housing case according to a third embodiment, in a closed state.
Figure 16:
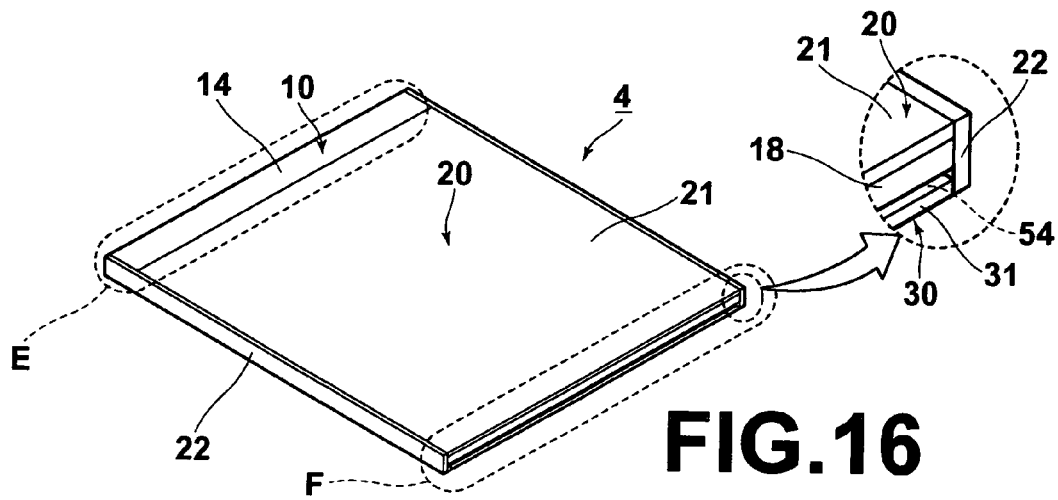
FIG. 16 is a perspective view of the disk housing case of FIG. 15 in a closed state.
Figure 17:
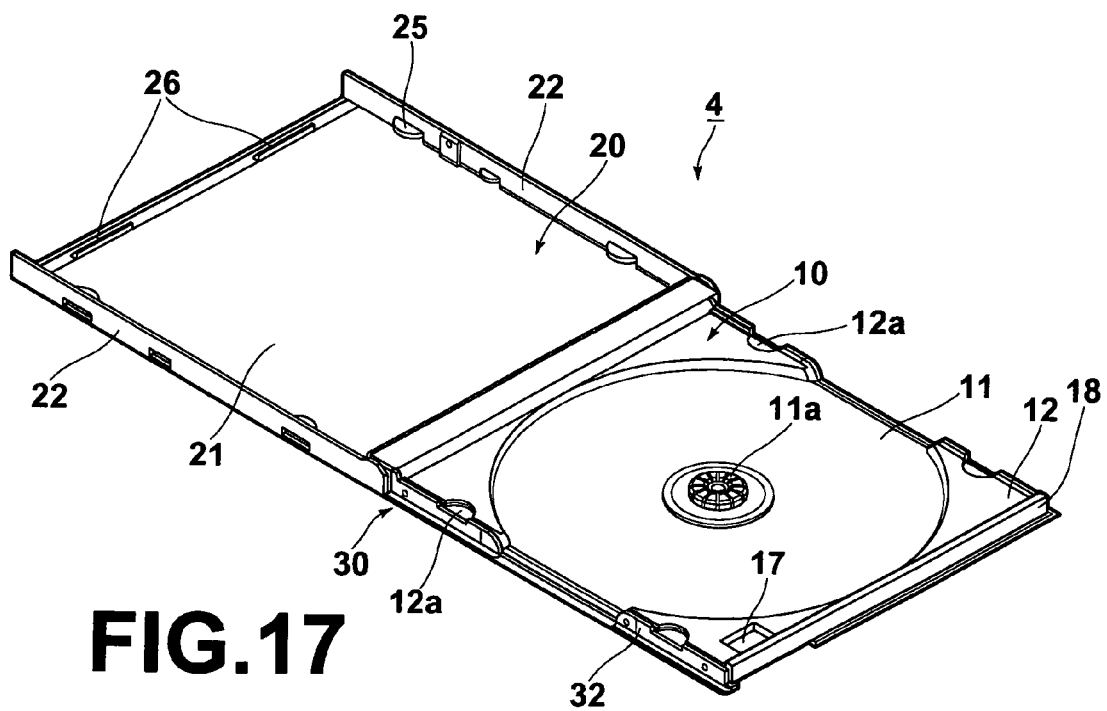
FIG. 17 is a perspective view of the disk housing case of FIG. 15 in an open state.
Figure 18:
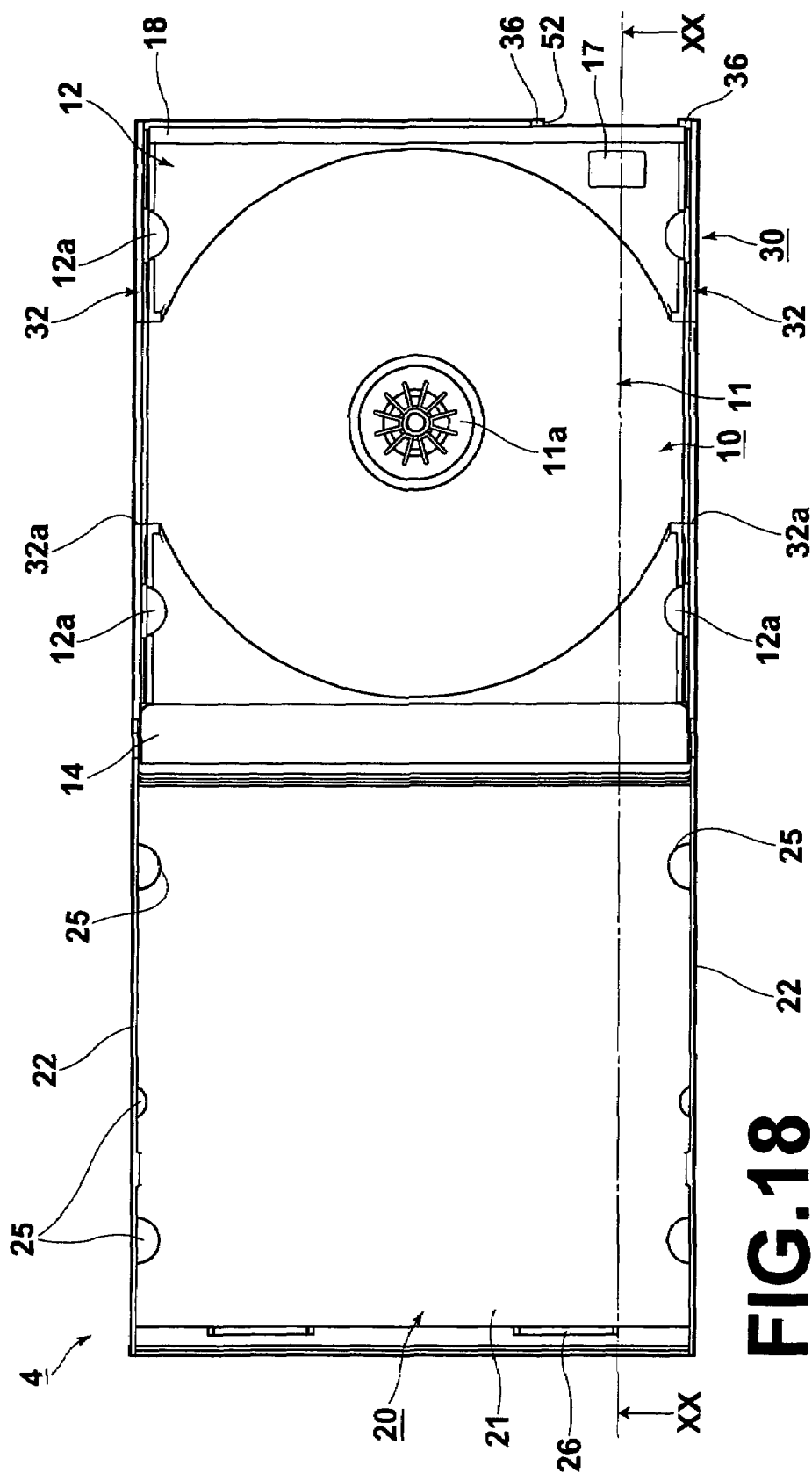
FIG. 18 is a plan view of the disk housing case of FIG. 15 in an open state.
Figure 20A:
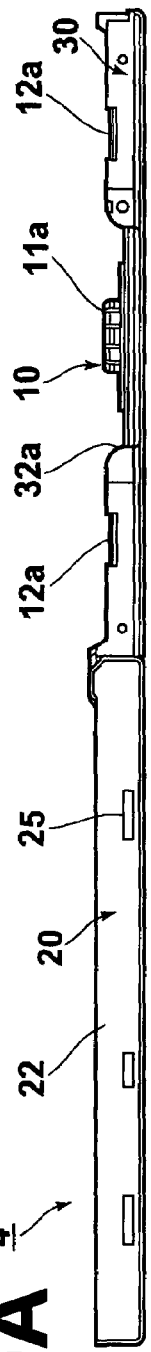
FIG. 20A is a front view of the disk housing case of FIG. 15 in an open state.
Figure 20B:
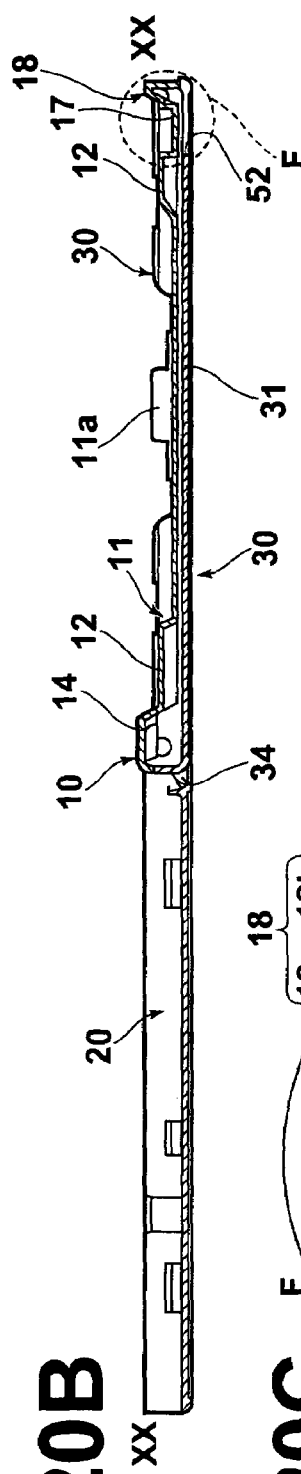
FIG. 20B is a sectional view taken along line XX-XX of FIG. 18.
Figure 20C:
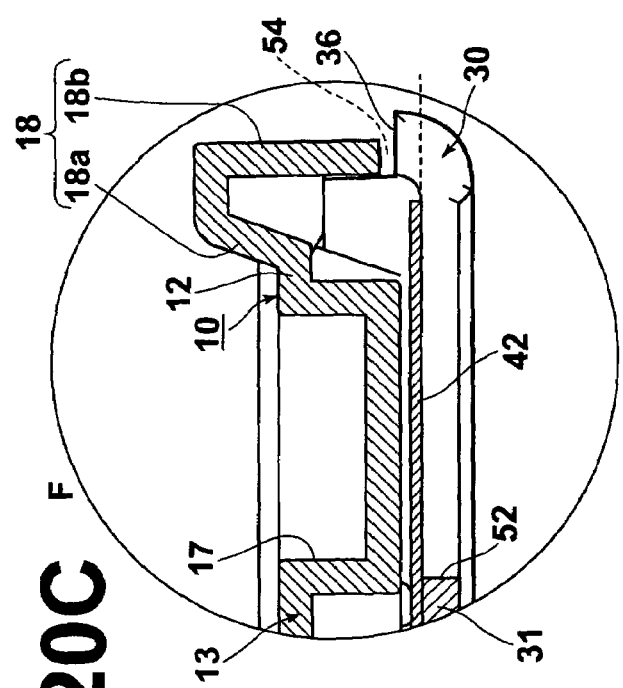
FIG. 20C is a magnified partial view of an end F of FIG. 20B.
Figure 21A:
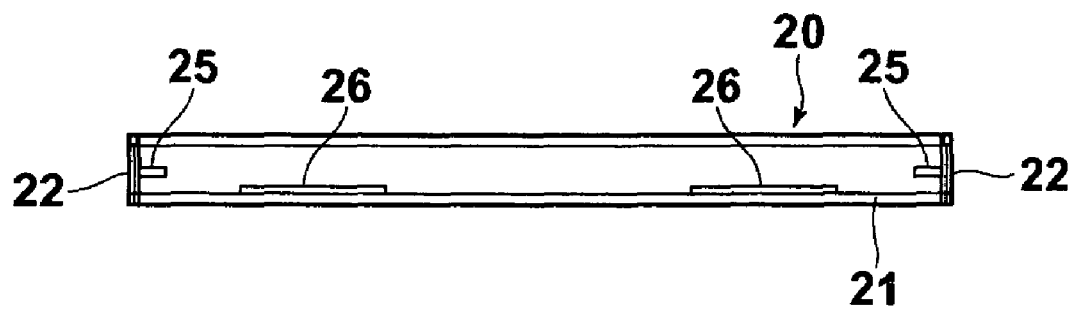
FIG. 21A is a left side view of the disk housing case of FIG. 15.
Figure 21B:
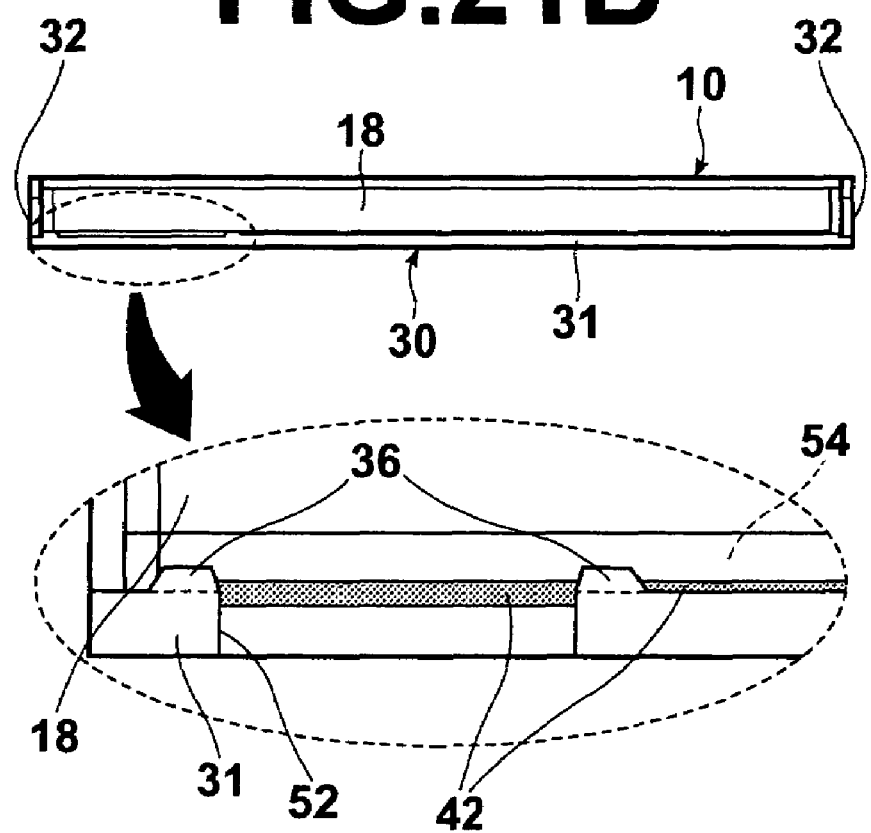
FIG. 21B is a right side view of the disk housing case.

A disk housing case 4 according to a third embodiment of the present invention will be described with reference to FIGS. 15 through 21B. The basic structure of the disk housing case 4 is the same as that of the disk housing case 3 of the second embodiment. Structural elements which are the same as those of the second embodiment will be denoted with the same reference numerals, and detailed descriptions thereof will be omitted. FIG. 15 is an exploded perspective view of the disk housing case 4 in a closed state. FIG. 16 is a perspective view of the disk housing case 4 in a closed state. FIG. 17 is a perspective view of the disk housing case 4 in an open state. FIG. 18 is a plan view of the disk housing case 4 in an open state. FIG. 19 is a bottom view of the disk housing case 4 in an open state. FIG. 20A is a front view of the disk housing case 4 in an open state (a rear view is the same as the front view, and therefore is omitted). FIG. 20B is a sectional view taken along line XX-XX of FIG. 18. FIG. 20C is a magnified partial view of the end F of FIG. 20B. FIG. 21A is a left side view of the disk housing case 4, and FIG. 21B is a right side view of the disk housing case 4. The recording medium disk 2 and indexes 41 and 42 are omitted from the figures as appropriate.

The first and second embodiments were configured such that one of the case halves 20 and 30 had a side wall at the end F thereof, and the slit 50 was provided in the side wall. In contrast, in the disk housing case 4 of the present embodiment, neither case half 20 nor 30 has a side wall at the end F thereof, as illustrated in FIGS. 15 and 17. The opening formed by the lack of side walls constitutes an index entry/exit opening 53, through which the front side index 41 and the rear side index 42 can be inserted and removed.

Neither of the ends F of the pair of case halves 20 and 30 toward the side of the index entry/exit opening has a side wall, and are open. Therefore, in the present embodiment, a wall 18, for partially sealing the gap between the flared portion 12 and the rear side index 42, is provided at the end F of the disk tray 10. The wall 18 serves to prevent dust and the like from entering the disk housing case 4.

As illustrated in FIGS. 20B and 20C, the wall 18 of the present embodiment is constituted by: a first side wall 18a that extends upward toward the front case half 20 from the flared portion 12 of the disk tray 10; and a second side wall 18b, which is bent back from the first side wall 18a toward the rear case half 30. The first side wall 18a is substantially symmetrical with the side wall 14a at the link end E of the disk tray 10. The second side wall 18b is greater in height than the first side wall 18a, and extends to the vicinity of the main body 31 of the rear case half 30.

As illustrated in FIGS. 20B, 20C, and 21B, the lower edge of the wall 18 (the lower edge of the second side wall 18b) is set at a position that leaves a gap 54 between the wall 18 and the rear case half 30, through which the rear side index 42 can be inserted and removed. The details will be described later, but protrusive stoppers 36 are provided at the end of the rear case half 30. Therefore, the distance between the second side wall 18b and the stoppers 36 is set to be greater than the thickness of the rear side index 42, to ensure that the rear side index 42 can be inserted and removed through the gap 54.

As illustrated in FIG. 16, it is not necessary to leave a gap, for the front side index to be inserted and removed through, between the upper end of the wall 18 (the bent portion) and the front case half 20. This is because when the pair of case halves 20 and 30 are in an open state, the front case half 20 and the wall 18 of the disk tray 10 are widely separated, and sufficient space for inserting and removing the front side index 41 appears automatically. A configuration, in which the upper end of the wall 18 abuts the main body 21 of the front case half when the case halves 20 and 30 are in a closed state, is preferable from the viewpoint of preventing dust and the like from entering the disk housing case 4.

In the present embodiment, a contact opening 52 is provided in the rear case half 30, at a position that faces the flared portion 12 of the disk tray in a manner similar to that of the second embodiment, as illustrated in FIGS. 15 and 19. The contact opening 52 enables a finger or the like to contact the rear side index 42. The contact opening 52 is shaped as a substantially semicircular cutout at the end of the rear case half 30 toward the index entry/exit opening.

Further, a support portion 17, for supporting the rear side index 42 during insertion and removal thereof, is provided on the disk tray 10 at a portion that faces the contact opening 52. The support portion 17 is formed as a rectangular embossed recess, and the depth of the recess is set such that the lower surface thereof approaches the rear side index 42.

In the present embodiment, the front side index 41 is inserted and removed by opening the pair of case halves 20 and 30 to separate the front case half 10 and the wall 18 of the disk tray 10. Then, the front side index is caused to slide through the end F, at which there are no side walls.

The rear side index 42 is inserted and removed by causing a finger or the like to contact the rear side index 42 through the contact opening 52 provided in the rear case half 30, while the disk tray 10 is fitted therein. Then, the rear side index 42 is caused to slide through the gap 54. The rear side index 42 can be inserted or removed with the pair of case halves in either an open state or a closed state.

In the present embodiment, both the front side index 41 and the rear side index 42 can be inserted and removed at the end F. Therefore, stoppers 26 and 36, for preventing inadvertent removal of the indexes 41 and 42, are provided on the main bodies 21 and 31 of the case halves 20 and 30, respectively, as illustrated in FIGS. 15 and 17.

The stoppers 26 are formed over comparatively wide ranges to the left and right sides of a central portion of the main body 21, when viewed from the side of the index entry/exit opening. The stoppers 26 are provided toward the interior of the end F of the front side case 20, so as to not contact the wall 18 of the disk tray 10. The stoppers 36 are provided as small protrusions adjacent to the contact opening 52 at the end F of the rear case half. The heights of the stoppers 26 and 36 are set within a range that does not greatly impede insertion and removal of the indexes 41 and 42, while preventing inadvertent removal thereof. In addition, the locations, shapes, and dimensions of the stoppers 26 and 36 are not limited to those illustrated in the figures, and may be set as appropriate.

The disk housing case 4 of the present embodiment is constructed as described above.

The disk housing case 4 of the present embodiment is of a construction, in which neither of the case halves 20 and 30 has a side wall at their ends F opposite their link ends. The openings formed thereby constitute the index entry/exit opening 53. In addition, the contact opening 52, for enabling a finger or the like to contact the rear side index 42 to insert and remove the rear side index 42, is provided in the rear case half 30. In this disk housing case 4 as described above, a finger can contact the rear side index 42 through the contact opening 52 to slide the rear side index 42 while the disk tray 10 is fitted in the rear case half 30. Thereby, the rear side index 42 can be inserted and removed through the ends F of the case halves 20 and 30, at which no side wall is provided. Accordingly, insertion and removal of the rear side index 42, which is interposed between the disk tray 10 and the rear case half 30, in which the disk tray 10 is fitted, can be realized without removing the disk tray 10 from the rear case half 30.

In the present embodiment, neither of the pair of case halves 20 and 30 has a side wall at their ends F opposite their link ends. Therefore, the front side index 41 can also be inserted and removed through the opening formed by the lack of side walls at the end F, as described above. In the case that the front side index 41 is inserted or removed at the link end E, it is necessary to feed the front side index 41 through a gap at the link portion between the case halves 20 and 30. In contrast, the present embodiment enables insertion and removal of the indexes 41 and 42 at the end F, which is completely open. Therefore, insertion and removal of the front side index 41 is facilitated as well.

In this manner, the present embodiment enables insertion and removal of the front side index 41 at the end F as well, which is preferable. However, there is no side wall at the link end E of the front case half 20, therefore the front side index 41 can also be inserted and removed at the link end E.

Further, the present embodiment provides the wall 18 that partially seals the space between the disk tray 10 and the rear side index 42, while leaving the gap 54, through which the rear side index 42 can be inserted and removed. Accordingly, entry of dust and the like into the disk housing case 4 can be suppressed, while securing ease in insertion and removal of both the front side index 41 and the rear side index, which is interposed between the disk tray 10 and the rear case half 30.

In the case that the contact opening 52 is simply provided in the portion of the rear case half 30 that faces the flared portion 12, the surface of the rear side index 42 opposite the surface to be contacted floats away from the disk tray 10. In other words, the rear side index 42 is not supported from behind, when viewed from the side of the contact opening 52, which may destabilize the sliding motion thereof. However, the present embodiment is provided with the support portion 17 on the disk tray at the portion thereof that faces the contact opening 52. Therefore, the rear side index 42 is supported from behind by the support portion 17, to stabilize the sliding motion of the rear side index 42 and to enable smooth insertion and removal thereof.

Modifications to the Third Embodiment

A case in which the side wall 18, constituted by: the first side wall 18a that extends upward toward the front case half 20 from the flared portion 12 of the disk tray 10; and the second side wall 18b, which is bent back from the first side wall 18a toward the rear case half 30, is provided on the disk tray 10 has been described as the third embodiment. The present invention is not limited to the construction described above. The wall 18 may be of any construction, as long as it partially seals the space between the disk tray 10 and the rear side index 42, while leaving the gap 54 to enable insertion and removal of the rear side index 42 therethrough. The number and shapes of the side walls that constitute the wall 18 may be set as appropriate. For example, the wall 18 may be constituted by: a first side wall that extends toward the rear case half 30 from the tray main body 13; and a second side wall, which is bent back from the first side wall to extend toward the front case half 20 (a bending structure reverse from that of the third embodiment).

The location, shape, and number of the contact opening 52 provided in the rear case half 30 are not limited to those of the second embodiment, and can be set as appropriate. Contact openings may be provided in the disk tray 10, as in the first embodiment. Alternatively, the contact openings may be provided in both the rear case half 30 and the disk tray 10.

Fourth Embodiment

Figure 22:
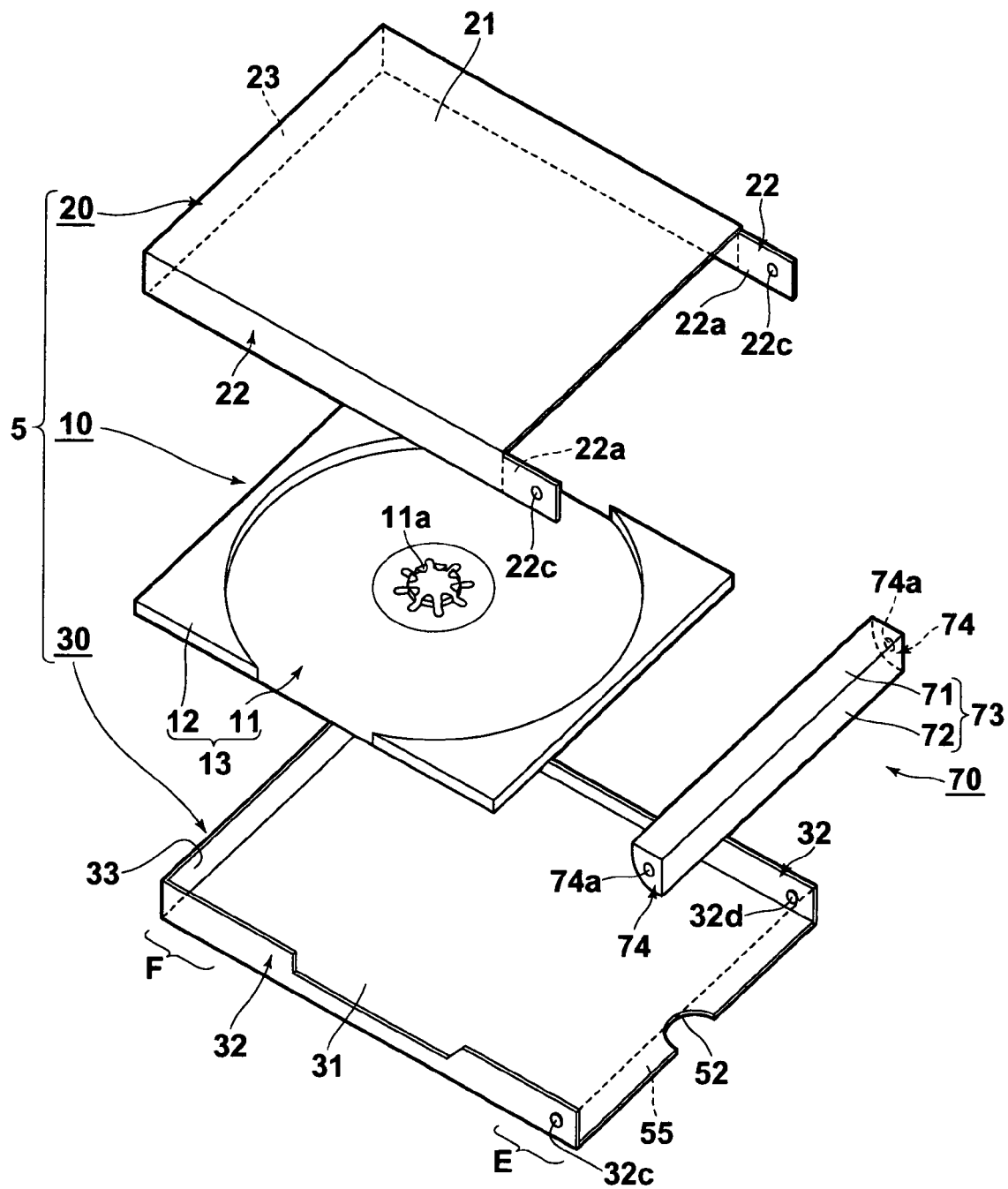
FIG. 22 is an exploded perspective view of a disk housing case according to a fourth embodiment, in a closed state.
Figure 23:
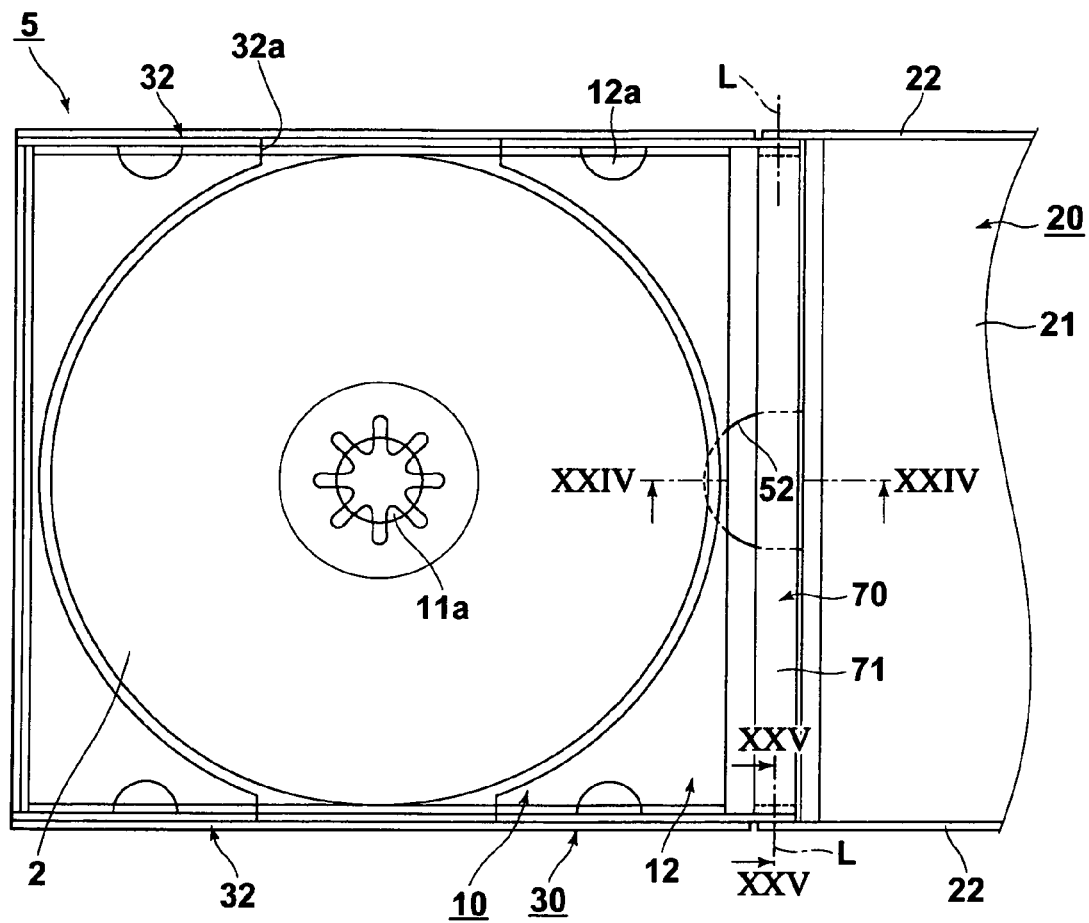
FIG. 23 is a partial plan view of the disk housing case of FIG. 22 in an open state.
Figure 25:
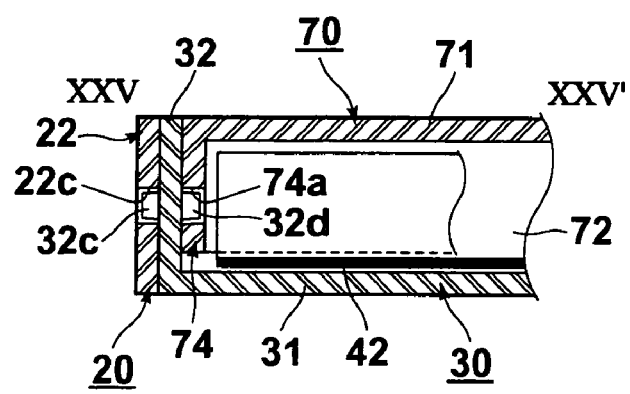
FIG. 25 is a partial sectional view taken along line XXV-XXV of FIG. 23.
Figure 26A:
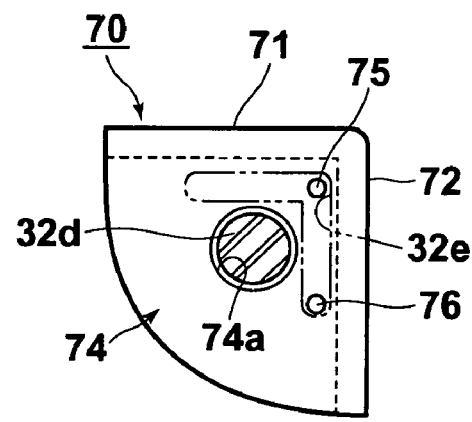
FIGS. 26A and 26B are side views of an end wall, when the rotating lid is in a closed state and an open state, respectively.
Figure 26B:
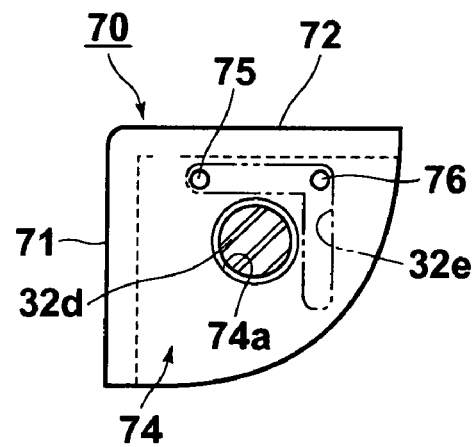

A disk housing case 5 according to a fourth embodiment of the present invention will be described with reference to FIGS. 22 through 26B. The basic structure of the disk housing case 5 is the same as that of the disk housing case 4 of the third embodiment. Structural elements which are the same as those of the first embodiment will be denoted with the same reference numerals, and detailed descriptions thereof will be omitted. FIG. 22 is an exploded perspective view of the disk housing case 5 in a closed state. FIG. 23 is a partial plan view of the disk housing case 5 in an open state. In FIG. 22, the ends of the pair of case halves 20 and 30 toward the viewer are the link ends E (first ends), and the ends away from the viewer are the ends F (second ends). FIGS. 24A, 24B, 24C, and 24D illustrate the movement of a rotating lid 70 to be described later, and are sectional views taken along line XXIV-XXIV of FIG. 23. FIG. 25 is a partial sectional view taken along line XXV-XXV of FIG. 23. FIGS. 26A and 26B are side views of an end wall 74 to be described later, when the rotating lid 70 is in a closed state and an open state, respectively. The recording medium disk 2 and indexes 41 and 42 are omitted from the figures as appropriate.

In the third embodiment, a configuration was adopted wherein: no side wall was provided at the ends F of either of the case halves 20 and 30; and the opening formed thereby served as the index entry/exit opening 53 for both the front side index 41 and the rear side index 42. In addition, in the third embodiment, the wall 18, for partially sealing the space between the disk tray 10 and the rear side index 42, was provided to suppress entry of dust and the like into the disk housing case 4.

In contrast, in the disk housing case 5 of the present embodiment has no side walls are provided at the link ends E of either of the case halves 20 and 30. The opening formed thereby constitutes an index exit/entry opening 55, through which the rear side index 42 is inserted and removed. In addition, the rotating lid 70, which is capable of sealing at least a portion of the index exit/entry opening 55 without impeding insertion and removal of the rear side index 42, is provided. The rotating lid 70 is pivotally supported at the interior of the front case half 20. The rotating lid 70 is provided instead of the wall 18 of the third embodiment, to suppress entry of dust and the like into the disk housing case 5. In the present embodiment, the rotating axis of the rotating lid is coaxial with a rotating axis L, about which the pair of case halves 20 and 30 rotate during opening and closing thereof.

In the present embodiment, side walls 23 and 33 are respectively provided at the ends F of the case halves 20 and 30. When the pair of case halves 20 and 30 are in a closed state, the side wall 23 of the front case half 20 overlaps with the side wall 33 of the rear case half 30, to the exterior thereof. Thereby, the rear case half 30 is fitted into the front case half 20.

The rotating lid 70 comprises: an upper plate 71, which is arranged between the link arms 22a; a side plate 72, which is formed continuous with the upper plate 71 and substantially perpendicular thereto; and a pair of fan shaped end walls 72, which are provided at both ends of the L-shaped portion 73 formed by the upper plate 71 and the side plate 72. The upper plate 71 becomes coplanar with the main body 21 of the front case half 20 when the disk housing case 5 is in a closed state. The side plate 72 faces the side wall 33 of the rear case half 30 when the disk housing case 5 is in a closed state. In the present embodiment, the flat portion 14b of the disk tray 10 as illustrated in FIG. 15 is not provided, because the rotating lid 70 comprises the upper plate 71.

As illustrated in FIGS. 24A, 24B, 24C, and 24D, the rear side index 42 is of the bent type, comprising: the main index portion 42a; and a sub index portion 42c, to be viewed from the link ends of the pair of case halves 20 and 30. The sub index portion 42c is housed along the inner surface of the side plate 72 of the rotating lid 70.

When the pair of case halves 20 and 30 are in a closed state, the pair of end walls 74 overlap with the pair side walls 34 of the rear case half, toward the interiors thereof, thereby fitting the rotating lid 70 within the rear case half 30. That is, as illustrated in FIG. 25, when the pair of case halves 20 and 30 are in a closed state, the rear case half 30 is fitted within the front case half 20, and the rotating lid 70 is fitted within the rear case half 30.

In the present embodiment, protrusions 32c are provided on the exterior surfaces of the pair of side walls 34 of the rear case half 30, and protrusions 32d are provided on the interior surfaces thereof. The protrusions 32c and 32d are arranged coaxially. Apertures 22c, for the protrusions 32c to enter, are provided in each of the pair of link arms 22a of the front case half 20. Apertures 74a, for the protrusions 32d to enter, are provided in each of the pair of end walls 74 of the rotating lid 70. The front case half 20 is pivotally supported by the rear case half 30 so as to be rotatable about the pair of protrusions 32c. The rotating lid 70 is pivotally supported by the rear case half 30 so as to be rotatable about the pair of protrusions 32d.

In the present embodiment, the contact opening 52 is provided in the rear case half 30 toward the side of the index entry/exit opening 55. The contact opening 52 is provided at the substantial center of the link end E of the rear case half 30. The shape of the contact opening 52 is the same as that of the third embodiment.

Positional changes of the rotating lid 70 and the method by which the rear side index 42 is inserted and removed will be described with reference to FIGS. 24A, 24B, 24C, and 24D.

As illustrated in FIG. 24A, when the rotating lid 70 is in a closed state, the upper plate 71 is coplanar with the main body 21 of the front case half 20, and the side plate 72 is at a position at which it faces the side wall 33 of the rear case half 30. In this closed state, the sub index portion 42c of the rear side index 42 is housed toward the interior of the side plate 72.

When the rotating lid 70 is rotated counterclockwise, as illustrated in FIG. 24B to reach its open state, as illustrated in FIG. 24C, the side plate 72 assumes the positions previously assumed by the upper plate 71 in the closed state. At this time, the upper plate 71 moves to a position at which it faces the side wall 33 of the rear case half 30. In the open state, the upper plate 71 moves toward the interior of the sub index portion 42c of the rear side index 42, to expose the sub index portion 42c.

In the present embodiment, as illustrated in FIGS. 24C and 24D, the height of the upper plate 71 is set to be lower than the height of the side plate 72. When the rotating lid 70 is in an open state, a gap 56, through which the rear side index 42 can be inserted and removed, is formed between the rotating lid 70 and the main body 31 of the rear case half 30.

In the present embodiment, engagement means, for engaging the rotating lid 70 at its closed position illustrated in FIG. 24A, and at its open position illustrated in FIG. 24C, are provided. Specifically, two engaging protrusions 75 and 76 are provided on the exterior surfaces of the pair of end walls 74 of the rotating lid 70, as illustrated in FIGS. 26A and 26B. In addition, engaging grooves 32a, with which the engaging protrusions 75 and 76 engage, are provided in the portions of the side walls 32 of the rear case half 30 that face the end walls 74.

The engaging protrusions 75 and 76 are arranged in a direction parallel to the plane of the side plate 72. The engaging grooves 32a are formed as L-shaped grooves. This shape enables the engaging protrusions 75 and 76 to engage the engaging groove 32a in both the closed position illustrated in FIG. 26A and the open position illustrated in FIG. 26B. The L-shape also enables the engaging protrusions 75 and 76 to slide smoothly within the engaging grooves 32a, which are fixed in position.

As illustrated in FIG. 24D, the rear side index 42 can be removed from the disk housing case 5, by: contacting the main index portion 42a with a finger or the like, through the contact opening 52 in the rear case half 30; causing the rear side index 42 to slide; and pulling the rear side index 42 through the gap 56. In the present embodiment, the sub index portion 42c is exposed to the exterior of the disk housing case 5 by the rotation of the rotating lid 70. Therefore, removal of the sub index portion 42c is also facilitated.

Insertion of the rear side index 42 may be performed, by performing the above operations in reverse.

The disk housing case 5 of the present embodiment is constructed as described above. The disk housing case 5 is of a construction, in which: neither the case half 20 nor the case half 30 is provided with a side wall at the link end E thereof; and the opening formed by the lack of side walls being the index entry/exit opening 55, through which the rear side index 42 can be inserted and removed. In addition, the contact opening 52, for enabling a finger or the like to contact the rear side index 42 to insert and remove the rear side index 42, is provided in the rear case half 30.

In this disk housing case 5 as described above, a finger can contact the rear side index 42 through the contact opening 52 to slide the rear side index 42 while the disk tray 10 is fitted in the rear case half 30. Thereby, the rear side index 42 can be inserted and removed through the ends E of the case halves 20 and 30, at which no side wall is provided. Accordingly, insertion and removal of the rear side index 42, which is interposed between the disk tray 10 and the rear case half 30, in which the disk tray 10 is fitted, can be realized without removing the disk tray 10 from the rear case half 30.

Further, in the present embodiment, the rotating lid 70 is provided. The rotating lid is capable of sealing at least a portion of the index exit/entry opening 55 without impeding insertion and removal of the rear side index 42. Accordingly, entry of dust and the like into the disk housing case S can be suppressed, while securing ease in insertion and removal of the rear side index 42.

In addition, the engaging means (the engaging protrusions 75, 76, and the engaging grooves 32e) are provided on the rotating lid 70 and the rear case half 30. The engaging means engages the rotating lid 70 at its closed position and its open position. Therefore, the rotating lid 70 is favorably fixed to the case half 30 in either the closed or open state thereof. By this configuration, the rear side index 42 can be prevented from protruding outwardly from the rotating lid 70 during normal use, thereby favorably housing the rear side index 42 within the disk housing case 5. In addition, the gap 56, through which the rear side index 42 is inserted and removed, can be favorably secured during insertion and removal of the rear side index 42. As a result, stable insertion and removal of the rear side index 42 can be realized.

What is claimed is:

1. A disk housing case, comprising:
    a disk tray for removably holding a recording medium disk; and
    a pair of case halves, which are linked at first ends thereof so as to be openable and closable, for housing the disk tray;
    the disk tray being fitted into at least one of the case halves;
    one of a card and a booklet index interposed between the disk tray and the at least one case half in which the disk tray is fitted;
    an index opening, which, without removal of the disk tray from said at least one case half and while the disk tray remains fitted therein, opens at least when the index is either inserted or removed, provided at a first end or a second end of each of the pair of case halves; and
    a contact opening, for enabling one of a finger and an index sliding member to contact the index to either insert or remove the index, provided in at least one of the disk tray and the case half in which the disk tray is fitted.

2. A disk housing case as defined in claim 1, wherein:
    a side wall is formed on at least one of the pair of case halves, at at least one of the first end and the second end thereof; and
    the index opening is a slit provided in the side wall.

3. A disk housing case as defined in claim 2, wherein:
    the index is a folded index, constituted by a main index portion that faces a main surface of the case half and a sub-index portion that faces the side wall; and the sub-index portion is pulled out from the slit to be arranged along the outer surface of the side wall.

4. A disk housing case as defined in claim 1, wherein:
the contact opening is provided in the disk tray;
the disk tray comprises: a substantially discoid disk housing recess, where the recording medium disk is fitted into and housed; and a flared portion that extends toward the exterior of the disk housing recess; and
the contact opening is provided so as to straddle the disk housing recess and the flared portion.

5. A disk housing case as defined in claim 1, wherein:
the contact opening is provided in the disk tray;
the disk tray comprises: a substantially discoid disk housing recess, where the recording medium disk is fitted into and housed; and a flared portion that extends toward the exterior of the disk housing recess; and
the contact opening is provided only in the flared portion.

6. A disk housing case as defined in claim 1, wherein:
the contact opening is provided in the disk tray;
the disk tray comprises: a substantially discoid disk housing recess, where the recording medium disk is fitted into and housed; and
the contact opening is provided only in the disk housing recess.

7. A disk housing case as defined in claim 1, wherein:
the disk tray comprises: a substantially discoid disk housing recess, where the recording medium disk is fitted into and housed; and a flared portion that extends toward the exterior of the disk housing recess;
protrusive ribs, for pressing the index toward the case half, are provided on the flared portion; and
the direction in which the ribs extend is parallel to the insertion and removal direction of the index.

8. A disk housing case as defined in claim 1, wherein:
a stop member, for preventing inadvertent removal of the index, is provided in the case half, into which the disk tray is fitted, toward the side of the index opening.

9. A disk housing case as defined in claim 1, wherein:
there are no side walls at at least one of the first and the second end of each of the case halves, the opening formed due to the lack of the side walls serving as the index opening; and
wall portions, for partially sealing the gap between the disk tray and the index, while leaving space for the index to be inserted and removed therethrough, is provided on the disk tray toward the side of the index opening.

10. A disk housing case as defined in claim 9, wherein:
the disk tray comprises a tray main body, constituted by: a substantially discoid disk housing recess, where the recording media disk is fitted into and housed; and a flared portion that extends toward the exterior of the disk housing recess; and
the wall portions comprise: a first side wall that extends from the tray main body toward one of the sides of the case halves; and a second side wall, which is bent back from the first side wall toward the other side of the case halves.

11. A disk housing case as defined in claim 1, wherein:
the disk tray comprises: a substantially discoid disk housing recess, where the recording media disk is fitted into and housed; and a flared portion that extends toward the exterior of the disk housing recess;
the contact opening is provided in the case half, into which the disk tray is fitted, at a portion thereof that faces the flared portion; and
a support portion, for supporting the index from the side of the disk tray at least during insertion and removal of the index, is provided on the disk tray at a portion thereof that faces the contact opening.

12. A disk housing case as defined in claim 1, wherein:
the contact opening is provided in the case half, into which the disk tray is fitted; and
the portion of the index which is exposed through the contact opening is covered with a surface protective layer.

13. A disk housing case as defined in claim 1, further comprising:
marks indicating the insertion and removal direction of the index, provided on at least one of the case half, into which the disk tray is fitted, the disk tray, and the index.

14. A disk housing case as defined in claim 1, wherein:
the index opening is provided in only one of the first ends and the second ends of the pair of case halves; and
an index guiding portion having a curved surface to regulate the index when it is inserted through the index opening, such that the leading end thereof curves along the curved surface to enable visual recognition thereof from the side of the case halves, is provided in at least one of the case half into which the disk tray is fitted, and the disk tray.

15. A disk housing as defined in claim 1, wherein:
there are no side walls at at least one of the first and second ends of the case halves, the opening formed due to the lack of the side walls serving as the index opening; and
a rotatable lid, which seals at least a portion of the index opening without obstructing either insertion or removal of the index through the index opening, is rotatably supported by one of the pair of case halves.

16. A disk housing case as defined in claim 15, further comprising:
engaging means, for engaging the rotatable lid at its closed position and at its open position, provided on the rotatable lid and the pair of case halves.

17. A disk housing case as defined in claim 15, wherein:
the pair of case halves are linked such that one of the case halves is rotatable with respect to the other;
the index opening and the rotatable lid are provided at the first ends of the case halves; and
the rotating axis of the case halves with respect to each other and the rotating axis of the rotatable lid are coaxial.

* * * * *